United States Patent
Wellman et al.

(10) Patent No.: US 10,810,521 B2
(45) Date of Patent: Oct. 20, 2020

(54) INFORMATION SYSTEM FOR INDUSTRIAL VEHICLES INCLUDING CYCLICAL RECURRING VEHICLE INFORMATION MESSAGE

(71) Applicant: Crown Equipment Corporation, New Bremen, OH (US)

(72) Inventors: Timothy A. Wellman, Coldwater, OH (US); Dean E. Winner, Celina, OH (US)

(73) Assignee: Crown Equipment Corporation, New Bremen, OH (US)

( * ) Notice: Subject to any disclaimer, the term of this patent is extended or adjusted under 35 U.S.C. 154(b) by 69 days.

(21) Appl. No.: 15/989,781

(22) Filed: May 25, 2018

(65) Prior Publication Data

US 2018/0276579 A1    Sep. 27, 2018

Related U.S. Application Data

(63) Continuation of application No. 12/871,001, filed on Aug. 30, 2010, now Pat. No. 9,984,341.

(Continued)

(51) Int. Cl.
*G06Q 10/06* (2012.01)
*G05D 1/02* (2020.01)
*G06Q 10/08* (2012.01)

(52) U.S. Cl.
CPC ......... *G06Q 10/06* (2013.01); *G05D 1/0287* (2013.01); *G05D 1/0291* (2013.01); *G06Q 10/0637* (2013.01); *G06Q 10/083* (2013.01)

(58) Field of Classification Search
None
See application file for complete search history.

(56) References Cited

U.S. PATENT DOCUMENTS

| 4,009,375 A | 2/1977 | White et al. |
|---|---|---|
| 4,251,813 A | 2/1981 | Carre |

(Continued)

FOREIGN PATENT DOCUMENTS

| CN | 1595908 A | 3/2005 |
|---|---|---|
| CN | 1614644 A | 5/2005 |

(Continued)

OTHER PUBLICATIONS

Australian Patent Examination Report dated Jan. 24, 2014 for Australian Patent Application No. 2010289731, Australian Government, IP Australia.

(Continued)

*Primary Examiner* — Peter Ludwig
(74) *Attorney, Agent, or Firm* — Stevens & Showalter LLP

(57) ABSTRACT

An information system for an industrial vehicle comprises an electronic component on the industrial vehicle that is programmably configured to obtain data by communicating across a vehicle network bus of the industrial vehicle with at least one other component of the industrial vehicle. The information system also comprises memory that stores industrial vehicle information according to a mapping specified by a data object model. Moreover, a processor on the industrial vehicle is programmed to repeatedly perform a cyclically recurring operation that extracts at least a portion of the industrial vehicle information stored in the memory device as broadcast information, generates at least one broadcast message representing the extracted broadcast information, and transmits the generated at least one broadcast message on the vehicle network bus. Accordingly, the entire contents of the broadcast information are repeatedly transmitted across the vehicle network bus in a cyclically recurring manner.

15 Claims, 12 Drawing Sheets

Related U.S. Application Data

(60) Provisional application No. 61/238,916, filed on Sep. 1, 2009.

(56) References Cited

U.S. PATENT DOCUMENTS

| | | | |
|---|---|---|---|
| 4,258,421 A | 3/1981 | Juhasz et al. | |
| 4,612,620 A | 9/1986 | Davis et al. | |
| 4,638,289 A | 1/1987 | Zottnik | |
| 4,677,429 A | 6/1987 | Glotzbach | |
| 4,728,922 A | 3/1988 | Christen et al. | |
| 4,757,712 A | 7/1988 | Jurca | |
| 4,949,263 A | 8/1990 | Jurca | |
| 5,058,044 A | 10/1991 | Stewart et al. | |
| 5,173,856 A | 12/1992 | Purnell et al. | |
| 5,257,190 A | 10/1993 | Crane | |
| 5,267,147 A | 11/1993 | Harshaw et al. | |
| 5,289,378 A | 2/1994 | Miller et al. | |
| 5,442,553 A | 8/1995 | Parrillo | |
| 5,454,074 A | 9/1995 | Hartel et al. | |
| 5,457,629 A | 10/1995 | Miller et al. | |
| 5,465,207 A | 11/1995 | Boatwright et al. | |
| 5,513,111 A | 4/1996 | Wortham | |
| 5,513,242 A | 4/1996 | Mukerjee et al. | |
| 5,526,269 A | 6/1996 | Ishibashi et al. | |
| 5,590,057 A | 12/1996 | Fletcher et al. | |
| 5,625,555 A | 4/1997 | Davis | |
| 5,650,928 A | 7/1997 | Hagenbuch | |
| 5,660,246 A | 8/1997 | Kaman | |
| 5,671,436 A | 9/1997 | Morris et al. | |
| 5,680,328 A | 10/1997 | Skorupski et al. | |
| 5,682,142 A | 10/1997 | Loosmore et al. | |
| 5,694,318 A | 12/1997 | Miller et al. | |
| 5,710,566 A | 1/1998 | Crabow et al. | |
| 5,712,625 A | 1/1998 | Murphy | |
| 5,714,946 A | 2/1998 | Gottshall et al. | |
| 5,715,905 A | 2/1998 | Kaman | |
| 5,737,215 A | 4/1998 | Schricker et al. | |
| 5,740,035 A | 4/1998 | Cohen et al. | |
| 5,747,786 A | 5/1998 | Cargin, Jr. et al. | |
| 5,781,871 A | 7/1998 | Mezger et al. | |
| 5,802,545 A | 9/1998 | Coverdill | |
| 5,838,251 A | 11/1998 | Brinkmeyer et al. | |
| 5,844,473 A | 12/1998 | Kaman | |
| 5,873,070 A | 2/1999 | Bunt et al. | |
| 5,890,086 A | 3/1999 | Wellman et al. | |
| 5,895,431 A | 4/1999 | Miller et al. | |
| 5,904,727 A | 5/1999 | Prabhakaran | |
| 5,928,292 A | 7/1999 | Miller et al. | |
| 5,948,026 A | 9/1999 | Beemer, II et al. | |
| 5,966,658 A | 10/1999 | Kennedy, III et al. | |
| 5,969,433 A | 10/1999 | Maggiora et al. | |
| 5,987,499 A | 11/1999 | Morris et al. | |
| 6,028,537 A | 2/2000 | Suman et al. | |
| 6,112,206 A | 8/2000 | Morris et al. | |
| 6,195,605 B1 | 2/2001 | Tabler et al. | |
| 6,212,449 B1 | 4/2001 | Wellman et al. | |
| 6,240,365 B1 | 5/2001 | Bunn | |
| 6,292,437 B1 | 9/2001 | Beard | |
| 6,295,492 B1 | 9/2001 | Lang et al. | |
| 6,339,745 B1 | 1/2002 | Novik | |
| 6,411,203 B1 | 6/2002 | Lesesky et al. | |
| 6,417,760 B1 | 7/2002 | Mabuchi et al. | |
| 6,430,485 B1 | 8/2002 | Hullinger | |
| 6,532,416 B1 | 3/2003 | Mueller | |
| 6,584,403 B2 | 6/2003 | Bunn | |
| 6,662,068 B1 | 12/2003 | Ghaffari | |
| 6,671,622 B2 | 12/2003 | McCall et al. | |
| 6,714,158 B1* | 3/2004 | Underbrink | G01S 19/24 342/357.63 |
| 6,714,857 B2 | 3/2004 | Kapolka et al. | |
| 6,744,436 B1 | 6/2004 | Chirieleison, Jr. et al. | |
| 6,754,562 B2 | 6/2004 | Strege et al. | |
| 6,799,099 B2 | 9/2004 | Zeitler et al. | |
| 6,804,626 B2 | 10/2004 | Manegold et al. | |
| 6,810,406 B2 | 10/2004 | Schlabach et al. | |
| 6,816,063 B2 | 11/2004 | Kubler et al. | |
| 6,832,139 B2 | 12/2004 | Johnson et al. | |
| 6,859,697 B2 | 2/2005 | Muragishi | |
| 6,862,443 B2 | 3/2005 | Witte | |
| 6,865,436 B2 | 3/2005 | O'Connor et al. | |
| 6,873,909 B2 | 3/2005 | Borugian | |
| 6,892,131 B2 | 5/2005 | Coffee et al. | |
| 6,898,493 B2 | 5/2005 | Ehrman et al. | |
| 6,952,680 B1 | 10/2005 | Melby et al. | |
| 7,062,446 B1 | 6/2006 | Suhy, Jr. et al. | |
| 7,117,075 B1 | 10/2006 | Larschan et al. | |
| 7,152,035 B1 | 12/2006 | Suhy, Jr. | |
| 7,165,040 B2 | 1/2007 | Ehrman et al. | |
| 7,171,381 B2 | 1/2007 | Ehrman et al. | |
| 7,356,494 B2 | 4/2008 | Ehrman et al. | |
| 7,387,243 B2 | 6/2008 | Magens et al. | |
| 7,395,275 B1 | 7/2008 | Parent | |
| 7,460,016 B2 | 12/2008 | Sorenson, Jr. et al. | |
| 8,060,400 B2 | 11/2011 | Wellman | |
| 8,190,322 B2 | 5/2012 | Lin et al. | |
| 8,249,910 B2 | 8/2012 | Wellman et al. | |
| 9,984,341 B2 | 5/2018 | Wellman et al. | |
| 2001/0018628 A1 | 8/2001 | Jenkins et al. | |
| 2001/0018639 A1 | 8/2001 | Bunn | |
| 2001/0037298 A1 | 11/2001 | Ehrman et al. | |
| 2002/0077944 A1 | 6/2002 | Bly et al. | |
| 2002/0082966 A1 | 6/2002 | O'Brien et al. | |
| 2002/0087345 A1 | 7/2002 | Bly et al. | |
| 2002/0089434 A1 | 7/2002 | Ghazarian | |
| 2002/0107873 A1 | 8/2002 | Winkler et al. | |
| 2002/0173910 A1 | 11/2002 | McCall et al. | |
| 2002/0186144 A1 | 12/2002 | Meunier | |
| 2002/0193910 A1 | 12/2002 | Strege et al. | |
| 2003/0028323 A1 | 2/2003 | Zeitler et al. | |
| 2003/0109271 A1* | 6/2003 | Lewis | H04L 29/06 455/517 |
| 2003/0114980 A1 | 6/2003 | Klausner et al. | |
| 2003/0130913 A1 | 7/2003 | Ehrman et al. | |
| 2003/0141964 A1 | 7/2003 | Su et al. | |
| 2003/0163249 A1 | 8/2003 | Kapolka et al. | |
| 2003/0195825 A1 | 10/2003 | Ehrman et al. | |
| 2003/0216976 A1 | 11/2003 | Ehrman et al. | |
| 2003/0225707 A1 | 12/2003 | Ehrman et al. | |
| 2003/0233177 A1 | 12/2003 | Johnson et al. | |
| 2004/0015419 A1 | 1/2004 | Ehrman et al. | |
| 2004/0039504 A1 | 2/2004 | Coffee et al. | |
| 2004/0049324 A1 | 3/2004 | Walker | |
| 2004/0085195 A1 | 5/2004 | McKibbon | |
| 2004/0093109 A1 | 5/2004 | O'Connor et al. | |
| 2004/0093291 A1 | 5/2004 | Bodin | |
| 2004/0102869 A1 | 5/2004 | Anderson et al. | |
| 2004/0106376 A1 | 6/2004 | Forster | |
| 2004/0138790 A1 | 7/2004 | Kapolka et al. | |
| 2004/0139806 A1 | 7/2004 | Christmas | |
| 2004/0262387 A1 | 12/2004 | Hart | |
| 2005/0002354 A1 | 1/2005 | Kelly et al. | |
| 2005/0029872 A1 | 2/2005 | Ehrman et al. | |
| 2005/0049021 A1 | 3/2005 | Nedelcu et al. | |
| 2005/0052281 A1 | 3/2005 | Bann | |
| 2005/0065678 A1 | 3/2005 | Smith et al. | |
| 2005/0065861 A1 | 3/2005 | Bann | |
| 2005/0086239 A1 | 4/2005 | Swann et al. | |
| 2005/0108089 A1 | 5/2005 | Ehrman et al. | |
| 2005/0131729 A1 | 6/2005 | Melby et al. | |
| 2005/0240378 A1 | 10/2005 | Smith et al. | |
| 2006/0053075 A1 | 3/2006 | Roth et al. | |
| 2006/0111822 A1 | 5/2006 | Simon | |
| 2006/0142913 A1 | 6/2006 | Coffee et al. | |
| 2006/0208890 A1 | 9/2006 | Ehrman et al. | |
| 2006/0208891 A1 | 9/2006 | Ehrman et al. | |
| 2006/0208892 A1 | 9/2006 | Ehrman et al. | |
| 2006/0229906 A1 | 10/2006 | Suhy, Jr. et al. | |
| 2007/0208476 A1 | 9/2007 | Baginski et al. | |
| 2007/0208477 A1 | 9/2007 | Baginski et al. | |
| 2007/0213897 A1 | 9/2007 | Estes et al. | |
| 2007/0229251 A1 | 10/2007 | Ehrman et al. | |
| 2007/0239292 A1 | 10/2007 | Ehrman et al. | |
| 2007/0239324 A1 | 10/2007 | Ehrman et al. | |

(56) References Cited

U.S. PATENT DOCUMENTS

| | | |
|---|---|---|
| 2007/0290840 A1 | 12/2007 | Ehrman et al. |
| 2008/0015955 A1 | 1/2008 | Ehrman et al. |
| 2008/0027604 A1 | 1/2008 | Oesterling |
| 2008/0068170 A1 | 3/2008 | Ehrman et al. |
| 2008/0068171 A1 | 3/2008 | Ehrman et al. |
| 2008/0136584 A1 | 6/2008 | Ehrman et al. |
| 2008/0140440 A1 | 6/2008 | Ehrman et al. |
| 2008/0140482 A1 | 6/2008 | Ehrman et al. |
| 2008/0140483 A1 | 6/2008 | Ehrman et al. |
| 2008/0140544 A1 | 6/2008 | Ehrman et al. |
| 2008/0154691 A1* | 6/2008 | Wellman ............ G06Q 10/0639 705/7.26 |
| 2008/0154712 A1 | 6/2008 | Wellman |
| 2008/0183522 A1 | 7/2008 | Ehrman et al. |
| 2008/0228346 A1 | 9/2008 | Lucas et al. |
| 2009/0037206 A1 | 2/2009 | Byrne et al. |
| 2010/0039247 A1 | 2/2010 | Ziegler et al. |
| 2010/0228428 A1 | 9/2010 | Harshbarger et al. |

FOREIGN PATENT DOCUMENTS

| | | |
|---|---|---|
| CN | 101369844 A | 2/2009 |
| EP | 0416171 A2 | 3/1991 |
| EP | 1189393 A2 | 3/2002 |
| EP | 2033933 A2 | 3/2009 |
| GB | 2288050 A | 10/1995 |
| GB | 2352521 A | 1/2001 |
| KR | 1020060055517 A | 5/2006 |
| KR | 1020090013529 A | 2/2009 |
| WO | 2000070530 | 11/2000 |
| WO | 0137118 A2 | 5/2001 |
| WO | 0137121 A2 | 5/2001 |
| WO | 03042891 A1 | 5/2003 |
| WO | 03061248 A2 | 7/2003 |
| WO | 2004104941 A2 | 12/2004 |
| WO | 2004112403 A2 | 12/2004 |
| WO | 2006022609 A1 | 3/2006 |

OTHER PUBLICATIONS

Chinese Office Action; Chinese Patent Application No. 200780051076.6; dated Feb. 23, 2011; State Intellectual Property Office of the People's Republic of China.

Chinese Office Action; Chinese Patent Application No. 201080038761.6; dated Apr. 14, 2014; State Intellectual Property Office of the People's Republic of China.

Zhang, Wen; Chinese Office Action; Chinese Patent Application No. 201080037616; dated Dec. 25, 2014; State Intellectual Property Office of the People's Republic of China.

Breidenich, Markus; Supplementary European Search Report, European Patent Application No. 10814328.0; dated Mar. 20, 2014; European Patent Office; Munich, Germany.

Jae Gwi Choi; International Search Report and Written Opinion of the International Searching Authority; International Application No. PCT/US2010/029327; dated Oct. 28, 2010; Korean Intellectual Property Office.

Jae Gwi Choi; International Search Report and Written Opinion of the International Searching Authority; International Application No. PCT/US2010/045267; dated Apr. 27, 2011; Korean Intellectual Property Office.

Jae Gwi Choi; International Search Report and Written Opinion of the International Searching Authority; International Application No. PCT/US2010/047090; dated Apr. 27, 2011; Korean Intellectual Property Office.

Smirnova, G.A.; Russian Office Action; Russian Patent Application No. 2012112649; dated Jul. 11, 2014; Moscow, Russian Federation.

Mohammad R. Ullah Masud; Non-final Office Action; U.S. Appl. No. 11/956,022; dated Sep. 1, 2010; U.S. Patent and Trademark Office; Alexandria, VA.

Mohammad R. Ullah Masud; Final Office Action; U.S. Appl. No. 11/956,022; dated Feb. 16, 2011; U.S. Patent and Trademark Office; Alexandria, VA.

Mohammad R. Ullah Masud; Non-final Office Action; U.S. Appl. No. 11/956,045; dated Mar. 1, 2011; U.S. Patent and Trademark Office; Alexandria, VA.

Peter L. Ludwig; Non-final Office Action; U.S. Appl. No. 12/871,001; dated Oct. 11, 2011; U.S. Patent and Trademark Office; Alexandria, VA.

Peter L. Ludwig; Final Office Action; U.S. Appl. No. 12/871,001; dated Jun. 19, 2012; U.S. Patent and Trademark Office; Alexandria, VA.

Peter L. Ludwig; Non-final Office Action; U.S. Appl. No. 12/871,001; dated Apr. 24, 2014; U.S. Patent and Trademark Office; Alexandria, VA.

Peter L. Ludwig; Final Office Action; U.S. Appl. No. 12/871,001; dated Sep. 8, 2014; U.S. Patent and Trademark Office; Alexandria, VA.

Peter L. Ludwig; Notice of Allowance; U.S. Appl. No. 12/871,001; dated Jan. 17, 2018; U.S. Patent and Trademark Office; Alexandria, VA.

The Examiner defines vehicle "bus" as "A parallel circuit that connects the major components of a computer, allowing the transfer of electric impulses from one connected component to any other", See American Heritage Dictionary of the English Language, Fourth Edition (2000) (cited in U.S. Appl. No. 12/871,001, filed Aug. 30, 2010).

The Examiner defines "mapping" as "a function" of "transformation", such that "The concept of mapping is logically the same as the concepts of function, operator, and transformation", See The Great Soviet Encyclopedia, 3rd Edition (1970-1979), (2010) at the Gale Group (cited in U.S. Appl. No. 12/871,001, filed Aug. 30, 2010).

Airport Vehicle Drive Access Control System, Truck log; Sep. 2004; TL005; Davis Derby Limited; Derby, England.

Asset Communicator-Magnetic Card Reader; I.D. Systems, Inc.

Drive Down Your Total Cost of Ownership; Powerkey Fleet Management Systems; Doc. #5001, Rev. #1.0, Oct. 4; International Electronics, Inc.; Canton, MA.

Easyview Direct 2 System Fleet Management-Monitor, Measure & Control, Truck Log; Jun. 2003; TL004; Davis Derby Limited; Derby, England.

Fleet Management Systems; forklift action.com; May 24, 2007; Newsletter #311.

Futuristic Fleet for Contract Foods; Yale Europe; Jun. 10, 2008; Material Handling World.

In the Driving Seat; Toyota Industrial Equipment; Jun. 2005.

Indoor Tracking Technology Demonstration Successful; forklift action.com; Oct. 9, 2008; Newsletter #381.

J.C. Fuentes Michel et al.; A Novell Wireless Forklift Positioning System for Indoor and Outdoor Use; Proceedings of the 5th Workshop on Positioning, Navigation and Communication 2008; (WPNC '08); pp. 219-227.

Keytroller Systems: Risk Minimisation in Forklift Operations; forklift action.com; May 18, 2007; Newsletter #311.

New System for Remote Monitoring; forklift action.com; Sep. 3, 2008; Newsletter #376.

RFID Technology and Personnel Protection System in Jungheinrich's EKX 513-515 Turret Trucks Mean Much Greater Efficiency and Safety; Jungheinrich-us.com; Nov. 24, 2008.

SD I System, Truck Log; Jun. 2003; TL001; Davis Derby Limited; Derby, England.

Smith, Greg; Wireless Management of Industrial Vehicles; Industrial Utility Vehicle & Mobile Equipment; Mar./Apr. 2004, vol. 6, Issue 2; Webcom Communications Corp.

Softwaresystem—Industrial Fleet Management; I.D. Systems, Inc.

Vehicle Asset Communicator—Weatherproof 20-Key Keypad; I.D. Systems, Inc.

The Examiner defines the verb "access" as "To make contact with or gain access to". See Random House Dictionary (2012) (cited in U.S. Appl. No. 12/871,001, filed Aug. 30, 2010).

Athina Nickitas-Etienne; International Preliminary Report on Patentability and Written Opinion of the International Searching Authority; International Application No. PCT/US2007/087440; dated Jun. 16, 2009; International Bureau of WIPO; Geneva, Switzerland.

(56) References Cited

OTHER PUBLICATIONS

Peter L. Ludwig; Corrected Notice of Allowance; U.S. Appl. No. 12/871,001; dated Feb. 8, 2018; U.S. Patent and Trademark Office; Alexandria, VA.
U.S. Appl. No. 12/871,001; entitled "Information System for Industrial Vehicles Including Cyclical Recurring Vehicle Information Message," filed Aug. 30, 2010 by Timothy A. Wellman.
Breidenich, Marcus; Examination Report; European Patent Application No. 10814328.0; dated May 4, 2018; European Patent Office; Munich, Germany.
Le Bolloch, Corine; Communication of Notice of Opposition; European Patent Application No. 10814328.0; dated Aug. 11, 2020; European Patent Office; Munich, Germany.
Zeltwanger (HRSG), Holger; "CANopen—Das standardisierte, eingebettete Netzwerk"; Ed. 2; 2008; ISBN:978-3-8007-2845-9; VDE Verlag GMBH, Berlin, Germany.
"CANopen Application Layer and Communication Profile"; Version 4.1; CAN in Automation (CiA) e.V.; Aug. 15, 2006. Erlangen, Germany.
"Surface Vehicle Recommended Practice"; SAE J1939-21; SAE International; Revision Dec. 2006, Part 21.

\* cited by examiner

INFORMATION SYSTEM FOR INDUSTRIAL VEHICLES INCLUDING CYCLICAL RECURRING VEHICLE INFORMATION MESSAGE

CROSS-REFERENCE TO RELATED APPLICATIONS

This application is a continuation application of U.S. patent application Ser. No. 12/871,001, filed Aug. 30, 2010, entitled INFORMATION SYSTEM FOR INDUSTRIAL VEHICLES INCLUDING CYCLICAL RECURRING VEHICLE INFORMATION MESSAGE, now allowed, which claims priority to U.S. Provisional Patent Application No. 61/238,916, filed on Sep. 1, 2009, entitled INFORMATION SYSTEM FOR INDUSTRIAL VEHICLES, the contents of which are incorporated herein by reference in their entirety.

BACKGROUND OF THE INVENTION

Wireless strategies may be deployed by business operations, including for example, warehousing facilities, distribution centers, retail stores, manufacturing facilities, etc., to improve the efficiency and accuracy of business operations. Wireless strategies may also be deployed by such business operations to avoid the effects of constantly increasing labor and logistics costs. In a typical wireless implementation, workers are linked to a customized software application executing on a corresponding computer system via a mobile wireless transceiver, such as a hand-held device. The wireless transceiver may be used as an interface to the customized software application to direct workers in their tasks, e.g., by instructing workers where and/or how to pick, pack, put away, move, stage, process or otherwise manipulate items within the facility. The wireless transceiver may also be used in conjunction with a suitable input device to scan, sense or otherwise read tags, labels such as barcode labels or other identifiers to track the movement of designated items within the facility.

In order to move items about a facility, workers often utilize industrial vehicles, including for example, forklift trucks, hand and motor driven pallet trucks, and/or other materials handling vehicles. However, disruptions in the operation of such industrial vehicles impact the ability of the management system and corresponding wireless strategy to obtain peak operating efficiency. Moreover, conventional enterprise software, including the above-described customized software applications, do not account for, track, communicate with or otherwise provide insight into the availability, health, status or suitability of the industrial vehicles to perform the required work. Still further, conventional enterprise software, including corresponding management systems, do not provide tools to manage access to, and operation of, industrial vehicles that are available within the facility, in an efficient and integrated manner.

BRIEF SUMMARY OF THE INVENTION

According to various aspects of the present invention, systems, methods and computer program products are provided, for dynamically generating industrial vehicle information for distribution from an industrial vehicle network bus. Industrial vehicle information is dynamically generated by assigning a select component within an industrial vehicle as an information master, where the information master is capable of data communication across an industrial vehicle network bus. The information master obtains data from at least one other component that is connected to the industrial vehicle network bus, and stores industrial vehicle information based upon the obtained data in a memory device accessible by the information master according to a mapping specified by a data object model.

Further, at least a portion of the memory associated with the data object model is designated as broadcast information. Still further, the information master repeatedly extracts at least a portion of the information stored in the memory designated as broadcast information, generates a broadcast message containing the extracted broadcast information and transmits the generated broadcast message on the industrial vehicle network bus wherein the entire contents of the designated broadcast information is eventually transmitted on the industrial vehicle network bus across a plurality of transmitted broadcast messages.

According to further aspects of the present disclosure, an information system for an industrial vehicle comprises an electronic component on the industrial vehicle that is programmably configured to obtain data by communicating across a vehicle network bus of the industrial vehicle with at least one other component of the industrial vehicle. The information system also comprises memory that stores industrial vehicle information according to a mapping specified by a data object model, where the industrial vehicle information is based upon the data obtained by the electronic component. Moreover, a processor on the industrial vehicle is programmed to repeatedly perform a cyclically recurring operation. The cyclically recurring operation extracts at least a portion of the industrial vehicle information stored in the memory device according to the mapping specified by the data object model as broadcast information, generates at least one broadcast message representing the extracted broadcast information, and transmits the generated at least one broadcast message on the vehicle network bus. Accordingly, the entire contents of the broadcast information are repeatedly transmitted across the vehicle network bus in a cyclically recurring manner.

According to yet further aspects of the present disclosure, an information system for an industrial vehicle comprises an electronic component on the industrial vehicle that is designated as an information master, which is programmably configured to obtain data by communicating across a vehicle network bus of the industrial vehicle with at least one other component of the industrial vehicle. The information system also comprises memory that stores industrial vehicle information according to a mapping specified by a data object model, where the industrial vehicle information is based upon the data obtained by the electronic component. Moreover, a processor on the industrial vehicle is programmed to repeatedly perform a cyclically recurring operation. The cyclically recurring operation extracts at least a portion of the industrial vehicle information stored in the memory device according to the mapping specified by the data object model as broadcast information, generates at least one broadcast message representing the extracted broadcast information, and transmits the generated at least one broadcast message on the vehicle network bus. Accordingly, the entire contents of the broadcast information are repeatedly transmitted across the vehicle network bus in a cyclically recurring manner. Moreover, each generated broadcast message is transmitted based upon a predetermined periodic time interval.

According to still further aspects of the present disclosure, an information system for an industrial vehicle comprises an electronic component on the industrial vehicle that is programmably configured to obtain data by communicating across a vehicle network bus of the industrial vehicle with at least one other component of the industrial vehicle. The information system also comprises memory that stores industrial vehicle information according to a mapping specified by a data object model, where the industrial vehicle information is based upon the data obtained by the electronic component. Moreover, a processor on the industrial vehicle is programmed to repeatedly perform a cyclically recurring operation. The cyclically recurring operation extracts at least a portion of the industrial vehicle information stored in the memory device according to the mapping specified by the data object model as broadcast information, generates a plurality of broadcast messages that collectively represent the extracted broadcast information, and transmits each generated broadcast message on the vehicle network bus. Accordingly, the entire contents of the broadcast information are repeatedly transmitted across the vehicle network bus in a cyclically recurring manner. Moreover, a device connected to the vehicle network bus must receive each of the plurality of broadcast messages in order to reconstruct the entirety of the broadcast information.

BRIEF DESCRIPTION OF THE SEVERAL VIEWS OF THE DRAWINGS

The following detailed description of various embodiments of the present invention can be best understood when read in conjunction with the following drawings, where like structure is indicated with like reference numerals, and in which.

DETAILED DESCRIPTION OF THE INVENTION

In the detailed description, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

System Architecture

Aspects of the present invention comprise systems that enable industrial vehicles to wirelessly communicate with one or more software applications, which may be deployed in a computer enterprise and/or which may be deployed within a remote computing environment associated with a trusted entity, examples of which are described in greater detail herein. Exemplary industrial vehicles may include forklift trucks, reach trucks, turret trucks, walkie stacker trucks, tow tractors, pallet trucks, and/or other materials handling vehicles. Further aspects of the present invention comprise processing systems on-board an industrial vehicle for assembling industrial vehicle information for communication to sources external to the corresponding industrial vehicle.

Figure 1:
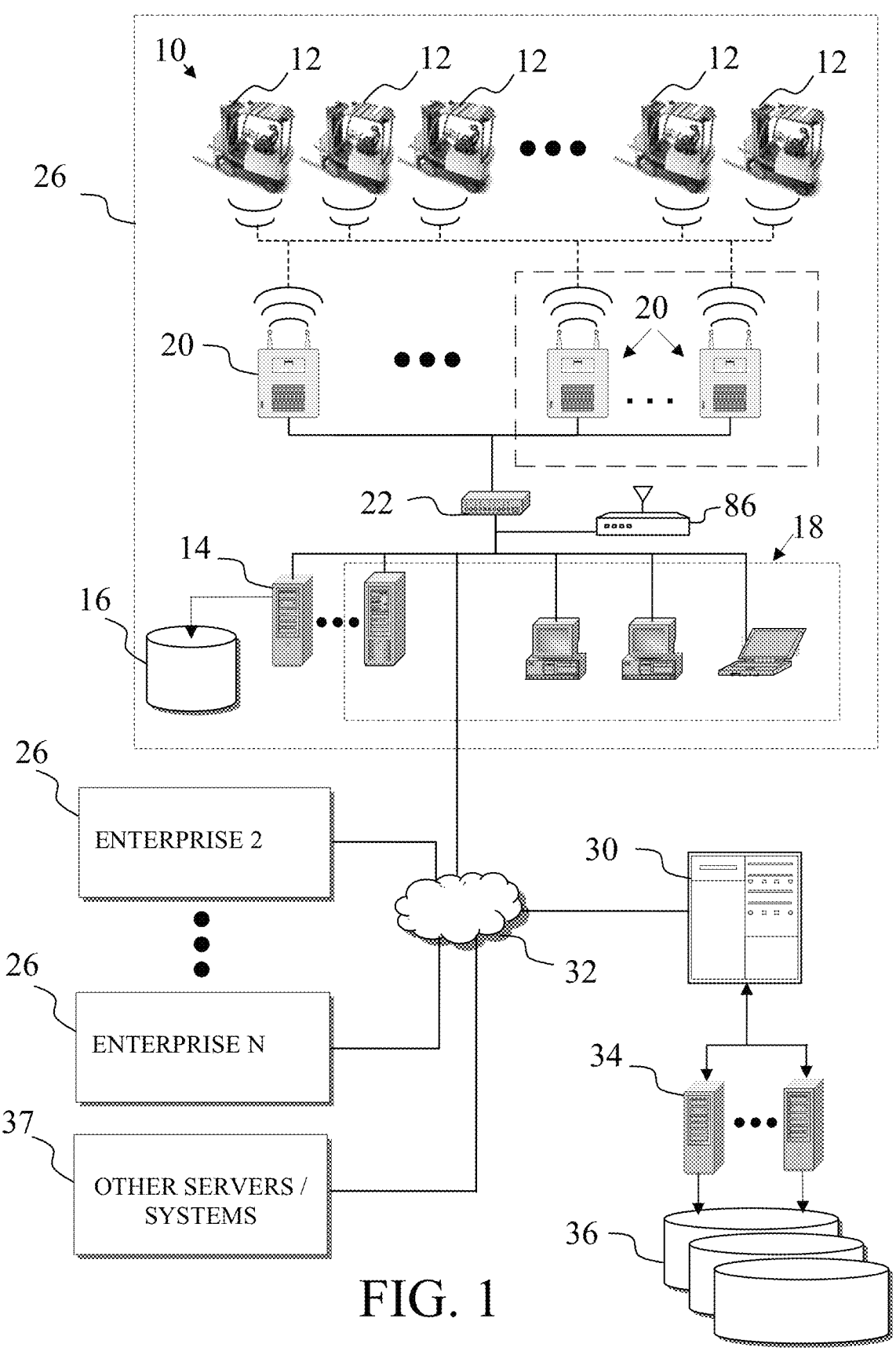
FIG. 1 is a schematic illustration of a communication system that enables wireless communication between mobile industrial vehicles and networked computing devices including a server according to various aspects of the present invention.

Referring now to the drawings and particularly to FIG. 1, an exemplary computing environment 10 is illustrated, which includes components that support wireless communication capabilities. A plurality of industrial vehicles 12, (shown by way of illustration as a fleet of forklift trucks for convenience of discussion) wirelessly communicate with a processing device, such as a server computer. For example, as illustrated, the plurality of industrial vehicles can each communicate with a server computer designated herein, as an industrial vehicle application server 14. The industrial vehicle application server 14 may further interact with a data resource 16, e.g., one or more databases, data stores or other sources of information, to facilitate interaction with users of remote computers and with the industrial vehicles 12 as will be described in greater detail herein.

The computing environment 10 may further support additional processing devices 18, which may comprise for example, additional server computers provided to execute other enterprise applications such as email, a warehouse management system (WMS), an Enterprise Resource Planning (ERP) application, etc.

The additional processing devices 18 may also comprise personal computers, notebook computers, transactional systems, appliance or pervasive computing devices such as personal data assistants (PDA), palm computers, cellular access processing devices, special purpose computing devices, network storage devices and/or other devices capable of interacting with the computing environment 10. One or more of the processing devices 18 may also communicate with the industrial vehicles 12 and/or the industrial vehicle application server 14 across the computing environment 10.

The wireless communication architecture may be based upon a standard wireless fidelity (Wi-Fi) infrastructure, such as may be deployed using a standard 802.11 a/b/g wireless network communications protocol. Moreover, communication over the wireless network may utilize security encryption, such as may be implemented using standard or proprietary encryption techniques. However, any other suitable wireless communication architecture, communication protocol and/or security techniques may alternatively be implemented.

In an exemplary illustrated arrangement, one or more wireless access points 20 are utilized to relay data between a wireless transceiver of each of the industrial vehicles 12 and one or more wired devices of the computing environment 10, e.g., the industrial vehicle application server 14. The number of access points 20 and the placement thereof may be determined based upon the specific implementation. For example, in a relatively large site, e.g., a large warehouse, distribution facility, retail outlet, etc., numerous access points 20 may be required to provide wireless communications coverage across a designated area in which the industrial vehicles 12 are to be operated. Correspondingly, in certain circumstances, a single access point 20 may be utilized. Still further, the vehicle systems described more fully herein can function, e.g., to store, log and otherwise collect data and process information, even in the absence of wireless access to an access point 20.

Moreover, the computing environment 10 may be supported by one or more networking components 22 that interconnect the various hardware and/or software processing devices, including for example, hubs, routers, firewalls, network interfaces and corresponding interconnections. The particular networking components 22 provided in the computing environment 10 may thus be selected to support one or more intranets, extranets, local area networks (LAN), wide area networks (WAN), wireless networks (Wi-Fi), the Internet, including the world wide web, and/or other arrangements for enabling communication across the computing environment 10, either real time or otherwise, e.g., via time shifting, batch processing, etc.

The networking components 22 further allow integration of wireless capability of industrial vehicles 12 across an entire enterprise 26 of a corresponding entity, e.g., a fleet operator. As schematically illustrated, each enterprise 26 represents a computing system of an independent entity, such as a warehouse owner, retailer, distributor, manufacturer or other entity that utilizes a fleet or plurality of industrial vehicles 12.

As described more fully herein, the fleet of industrial vehicles 12 associated with each entity and correspondingly, each enterprise 26, may be maintained in a single computing environment 10 or the enterprise 26 may be organized into a distributed enterprise architecture, for example, wherein several locally maintained computing environments 10, e.g., distinct physical locations, are connected across a network, such as a LAN, WAN, the Internet, etc. Thus, each locally maintained computing environment 10 may represent, for example, one physical location, e.g., a warehouse, a logical location, e.g., warehouse region, etc., which collectively form an enterprise 26. In this regard, the enterprise 26 may generally provide some form of common network control or supervision over the associated local computing environments.

As an illustrative example, an entity may have operations including industrial vehicles 12 at multiple distinct sites, and may thus operate a plurality of computing environments 10, one computing environment associated with each distinct site. However, the various computing systems within the computing environment 10 at each site may be controlled by the same entity and may be interconnected, capable of communication or are otherwise integrated into a commonly maintained enterprise 26. Under this configuration, each distinct site may maintain its own industrial vehicle application server 14, or the enterprise 26, which is comprised of the plurality of computing environments 10, may manage each distinct site from a centralized location within the enterprise 26.

As such, the industrial vehicle application server 14 need not reside in the same physical location as the industrial vehicles 12. Rather, data links can be set up using combinations of access points 20, networking components 22 and networks to distribute the fleet of industrial vehicles 12 across the physical locations, e.g., multiple warehouse facilities of the entity enterprise.

One or more computing environments 10 and/or enterprises 26 may further communicate with a remote server computer 30, e.g., across a network 32 such as the Internet. The remote server 30 may comprise, for example, an independently maintained third party server, such a manufacturer server that is configurable for interaction with the industrial vehicles 12, the industrial vehicle application server 14 and/or other processing devices 18 of the computing environment(s) 10. In this regard, each enterprise 26 may be maintained, for example, by a customer of the manufacturer, who maintains the remote server 30. The remote server 30 may further interact with one or more back-end servers 34 and/or data resource 36, e.g., one or more databases, data stores or other sources of information.

As another illustrative example, one or more components of the industrial vehicle application server 14 and/or data resources 16, e.g., software components, data, etc., may be co-located at an associated enterprise 26 and on the remote server 30. Alternatively, one or more components of the industrial vehicle application server 14 and/or data resources 16, e.g., software components, data, etc., may be distributed between an associated enterprise 26 and on the remote server 30. As yet another illustrative example, the components of the industrial vehicle application server 14 and/or data resources 16, e.g., software components, data, etc., may be located on the remote server 30.

Thus, depending upon the particular implementation, data processed, gathered, detected, monitored or otherwise wirelessly transmitted by industrial vehicles 12 may be locally maintained, e.g., by an instance of the industrial vehicle application server 14. This data may also be shared across distinct physical sites of an enterprise 26. Still further, this data may be shared between sites and/or enterprises 26 etc., and remote server(s) 30, or entirely maintained by the remote server 30, which may be associated with a trusted third party, such as an industrial vehicle manufacturer. Still further, relevant portions of the data may be shared with multiple trusted independent third party remote servers, e.g. 30, 37.

The present application may further exploit system computer architectures as described more fully in patent application Ser. No. 11/956,022 (Published as U.S. 2008-0154712 A1) entitled "Fleet Management System", filed Dec. 13, 2007, which is hereby incorporated by reference in its entirety. The present application also hereby incorporates by reference, patent application Ser. No. 11/956,045 (Published as U.S. 2008-0154691 A1), entitled "Fleet Management System" filed Dec. 13, 2007, in its entirety. Still further, the present application incorporates by reference, U.S. Provisional Pat. App. No. 61/166,494, entitled "INFORMATION SYSTEM FOR INDUSTRIAL VEHICLES", filed Apr. 3, 2009, in its entirety.

The Vehicle Interface

Figure 2:
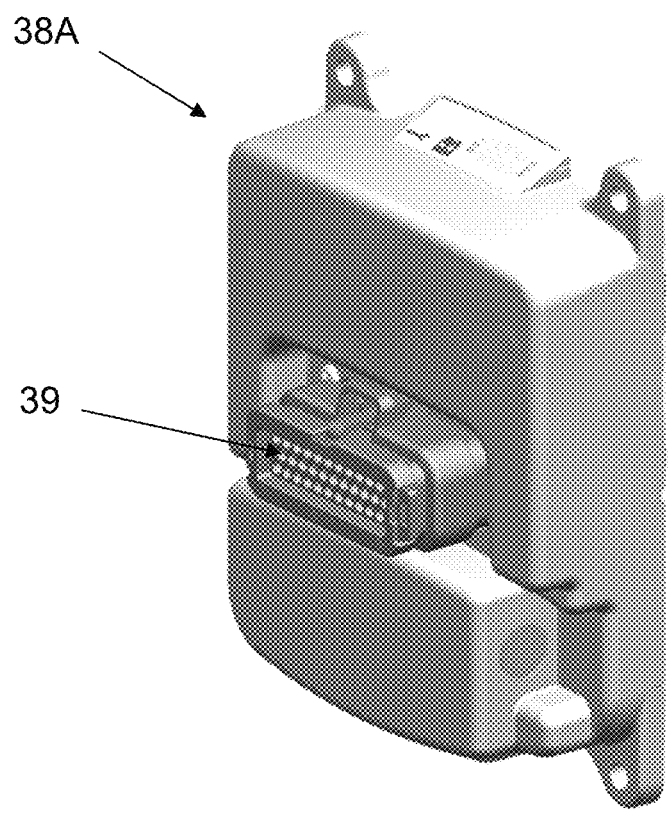
FIG. 2 is an illustration of an information linking device capable of wirelessly communicating data between an industrial vehicle and a corresponding server according to various aspects of the present invention.

Referring to FIG. 2, an information linking device 38A may be implemented as a "black box" that provides among other features, a wireless interface to an associated one of the industrial vehicles 12 that the information linking device 38A is installed on. In this exemplary implementation, the information linking device 38A does not include its own display and/or user interface. Rather, as illustrated, the information linking device 38A includes a housing that contains the processing electronics (hardware and software) of the information linking device 38A. Additionally, the housing supports a set of connections to vehicle features, e.g., via a connector 39, which facilitates communication with the various components of the corresponding one of the industrial vehicles 12 as will be described in greater detail herein.

Figure 3:
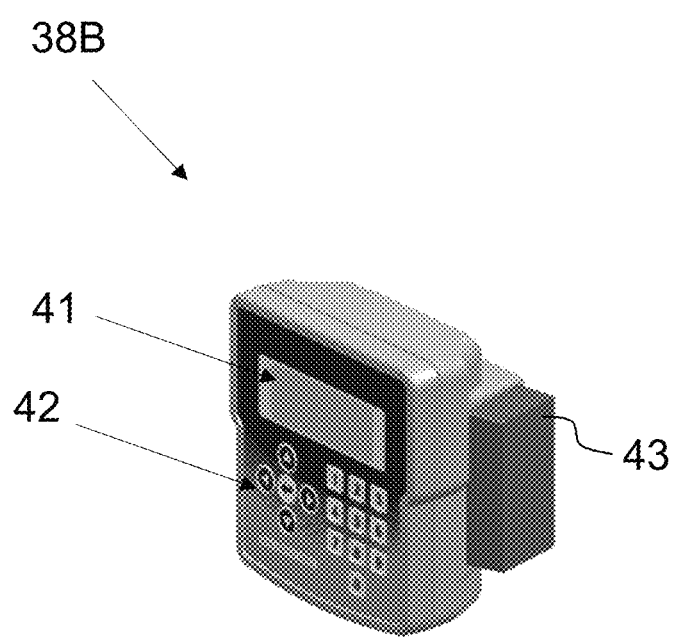
FIG. 3 is an illustration of an alternative implementation of an information linking device according to further aspects of the present invention.

Referring to FIG. 3, another exemplary implementation of an information linking device suitable for installation on the industrial vehicles 12 is illustrated, and as such, is designated by the reference numeral 38B. The illustrated information linking device 38B may serve as an interface that facilitates interaction with the user at one of the industrial vehicles 12, and is also enabled by hardware and software as will be described in greater detail herein. The information linking device 38B includes similar features to the information linking device 38A illustrated in FIG. 2 and thus includes for example, a connector 39, which is not shown in FIG. 3 but is analogous to the connector 39 of FIG. 2. Unlike the information linking device 38A however, the information linking device 38B also includes a display 41 and controls 42 for interacting with an operator.

Figure 4:
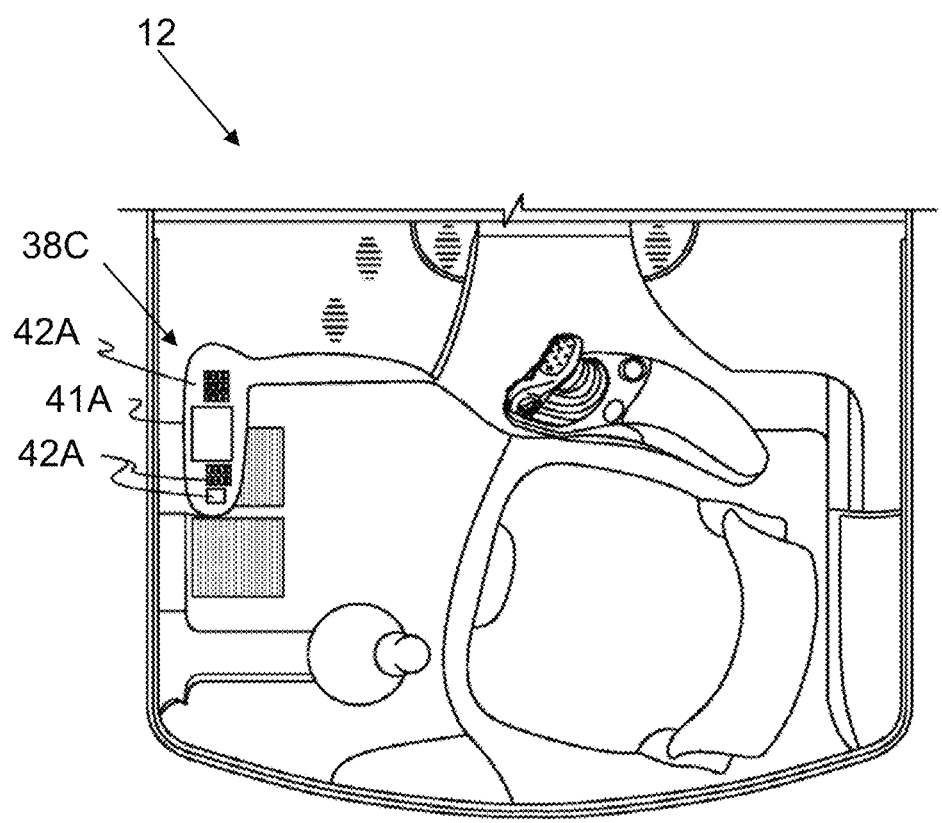
FIG. 4 is an illustration of yet another alternative implementation of an information linking device that is integrated into the electronics of a corresponding industrial vehicle according to various aspects of the present invention.

Referring to FIG. 4, the information linking device may alternatively be integrated with (built into) a corresponding one of the industrial vehicles 12, and as such, is designated by the reference numeral 38C. As an example, the information linking device 38C may be integrated into a work area, e.g., a console of an operator's compartment of one of the industrial vehicles 12. For example, as illustrated, the information linking device 38C is integrated directly into existing industrial vehicle features, e.g., by blending the information linking device 38 with a display 41A, interface controls 42A, or other electronics already located within a corresponding one of the industrial vehicles 12. The information linking device 38C may also include features set out and described with reference to FIGS. 2 and/or 3.

Referring to FIGS. 2-4 generally, the information linking device 38A, 38B, 38C may further include additional features, such as a reading device 43 (illustrated in FIG. 3), e.g., a fob reader, proximity reader or other device for electronically obtaining industrial vehicle operator login information. Unless otherwise specifically stated, reference herein to an information linking device referenced generally by the numeral 38 will apply to each of the various implementations described with reference to FIGS. 2-4.

Each information linking device 38 is assigned or otherwise derives a unique identifier that is known or made known to a corresponding industrial vehicle application server 14. Thus, using the known identifiers, the industrial vehicle application server 14 may conduct targeted communications with specific industrial vehicle information linking devices 38, or broadcast information to groups or all of the industrial vehicle information linking devices 38 that are associated with that industrial vehicle application server 14.

According to an aspect of the present invention, to initiate communication between the industrial vehicle application server 14 and an information linking device 38, an acknowledgment sequence is implemented. For example, the industrial vehicle application server 14 may listen for information linking device(s) 38 to identify themselves as being available for communication with the industrial vehicle application server 14. Alternatively, the industrial vehicle application server 14 can send out a request or ping a specific information linking device 38 on one of the industrial vehicles 12. If the pinged information linking device 38 responds to the industrial vehicle application server 14, an exchange of information between the information linking device 38 and the industrial vehicle application server 14 may occur.

Figure 5:
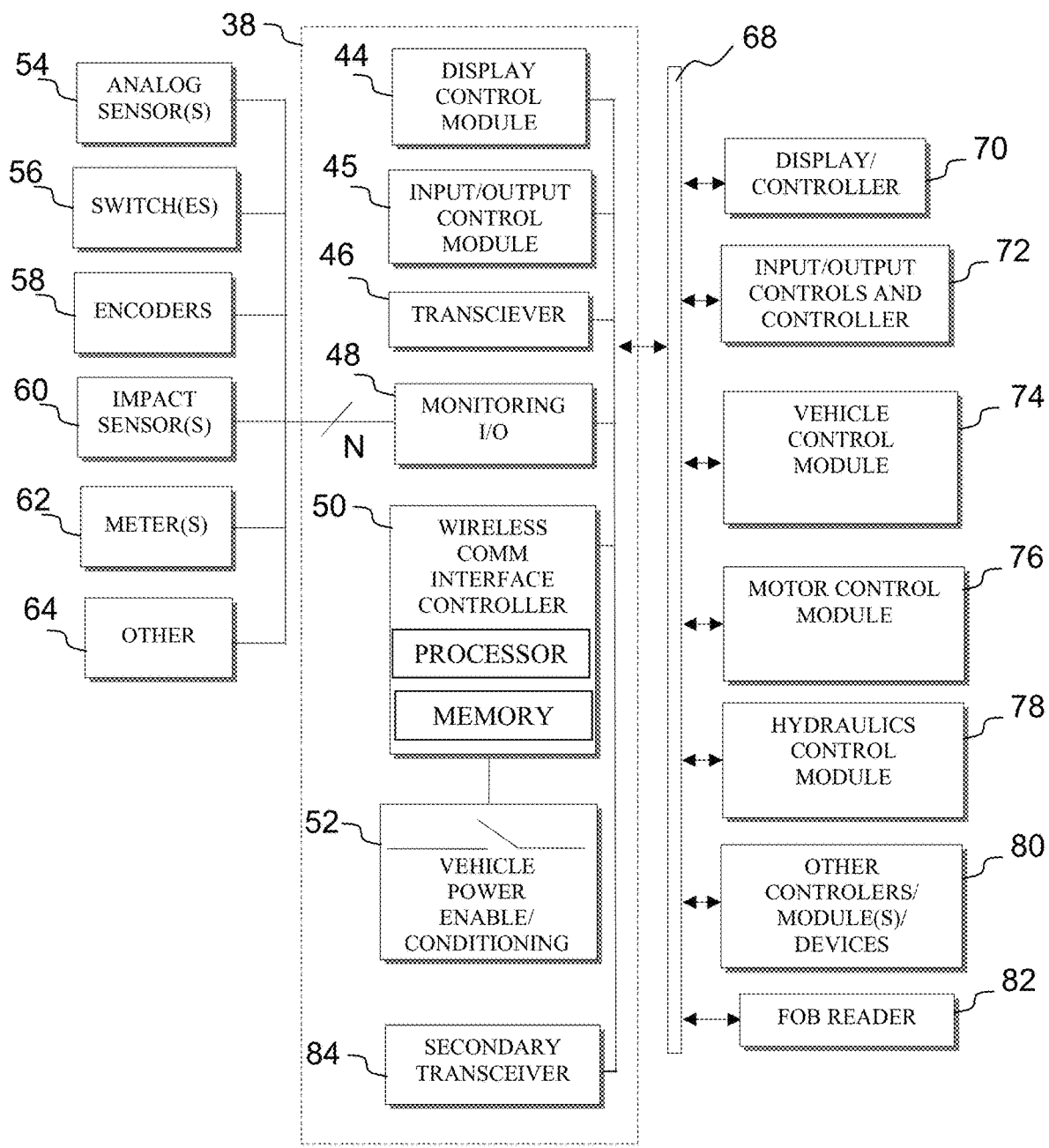
FIG. 5 is a block diagram of an information linking device and corresponding vehicle features according to various aspects of the present invention.

Referring to FIG. 5, a block diagram illustrates select features of an exemplary implementation of an information linking device 38 and corresponding illustrative features of an associated one of the industrial vehicles 12. The illustrated information linking device 38 may comprise an optional display control module 44 for controlling the display 41 if provided, and an optional input/output control module 45 that is associated with the controls 42, e.g., for an implementation of an information linking device 38B, such as that described with reference to FIG. 3. Correspondingly, the illustrated implementation of the information linking device 38A in FIG. 2 may omit the display control module 44 and the input/output control module 45, as this black box version does not include a user interface.

The information linking device 38 further comprises a transceiver 46, a monitoring input/output module 48, a wireless communications interface controller 50 and vehicle power enabling/conditioning circuitry 52. The transceiver 46 may provide, for example, two-way wireless communication with processing devices, including server computers such as the industrial vehicle application server 14 across the corresponding computing environment 10. The monitoring input/output module 48 may be utilized to receive sensor and control inputs and/or to control outputs such as horns, buzzers, lights and other vehicle components and/or devices. As just a few exemplary illustrations, the monitoring input/output module 48 may interface with analog sensors 54, switches 56, encoders and other similar input devices 58, impact sensor(s) 60, meter input(s) 62 and any other analog or digital input and/or output devices 64 to integrate information from such devices into the wireless communications system associated with the corresponding computing environment 10. The monitoring input/output module 48 allows data logging capabilities which can be used, for example, to monitor travel usage meters, hydraulic usage meters, steering usage meters, operator usage meters, miscellaneous sensor inputs and other types of vehicle related data.

Information detected by the monitoring input/output module 48 may be temporarily stored, collected, maintained, manipulated and/or otherwise processed, e.g., by a processor and corresponding memory in the interface controller 50 or other suitable processor and memory, which may be provided as part of the vehicle electronics. Further, the collected information may be communicated to a corresponding industrial vehicle application server 14, for example, using the transceiver 46.

The interface controller 50 may comprise a suitable processor, memory, software, resident firmware, etc., to control the functions of the information linking device 38 as described more fully herein. Moreover, the processor of the interface controller 50 may be configured to communicate with the transceiver 46 for wireless communication across a wireless infrastructure of a corresponding computing environment 10 to a corresponding server computer, e.g., the industrial vehicle application server 14. The power enabling/conditioning circuitry 52, where applicable, allows power to be provided to the information linking device 38, even when the corresponding industrial vehicle 12 is powered down. Moreover, the power enabling/conditioning circuitry 52 can be tied to the vehicle ignition to prevent industrial vehicle startup unless certain conditions are met, or to force an industrial vehicle to shut down, as schematically represented by the switch shown within the box representing the power enabling/conditioning circuitry 52 in FIG. 5. As an example, industrial vehicle startup conditions may be evaluated by the interface controller 50 of the information linking device 38 or other suitable processor before allowing an industrial vehicle to be powered up and fully functional for operation.

In an illustrative implementation where an industrial vehicle comprises for example, a forklift truck, the components of the information linking device 38 may be coupled to and/or communicate with other industrial vehicle system components via a suitable industrial vehicle network system 68, e.g., a vehicle network bus. The industrial vehicle network system 68 is any wired or wireless network, bus or other communications capability that allows electronic components of an industrial vehicle to communicate with each other. As an example, the industrial vehicle network system 68 may comprise one or more: controller area network (CAN) bus, ZigBee, Bluetooth, Local Interconnect Network (LIN), time-triggered data-bus protocol (TTP), Ethernet or other suitable communication strategy. As will be described more fully herein, utilization of the industrial vehicle network system 68 enables integration of the components of the information linking device 38 into the native electronics including controllers of the industrial vehicle and optionally, any electronics peripherals associated with the industrial vehicle that integrate with and can communicate over the network system 68.

Thus, as an example, a processor provided on an industrial vehicle, e.g., as provided within the interface controller 50 or otherwise integrated into the industrial vehicle 12, may be configured to wirelessly communicate with the industrial vehicle application server 14 via the transceiver 46. Moreover, the information linking device 38 may interact with at least one component of the associated industrial vehicle 12, such as by communicating with at least one native electronic control module 70, 72, 74, 76, 78, 80, 82 of the industrial vehicle 12 across the vehicle network system 68, e.g., a CAN bus.

In this regard, the connector 39 may be utilized to connect the information linking device 38 to various components coupled to the monitoring input/output module 48 and/or to the vehicle network system 68, e.g., a CAN bus. As such, as will be described more fully herein, the information linking device 38 may be utilized as a bridge to exchange information with regard to various components of or otherwise attached to the associated one of the industrial vehicles 12, and enable native vehicle processes and features of a corresponding one of the industrial vehicles 12 to process external to the industrial vehicle, e.g., to the industrial vehicle application server 14, remote server 30, or other device, as will be described in greater detail herein.

Integration is further achieved where event codes and other communications across the vehicle network system 68 are well understood by the information linking device 38, thus enabling interaction between the industrial vehicle application server 14, the information linking device 38 and the corresponding one of the industrial vehicles 12, e.g., at the machine component, subsystem, and system levels, as will be described in greater detail herein.

Still further, according to further aspects of the present invention, an optional secondary or alternative communication device may be utilized. By way of illustration, a secondary transceiver 84 may comprise a cellular device capable of communicating independently of the wireless infrastructure of the corresponding computing environment 10 and/or enterprise 26. Although illustrated in FIG. 5 as part of the information linking device 38, the secondary transceiver 84 may alternatively be provided as a separate component that couples to either the vehicle network bus 68, e.g., a CAN bus, or the secondary transceiver 84 may couple directly to the information linking device 38.

Referring briefly back to FIG. 1, as an alternative to equipping each of the industrial vehicles 12 with its own secondary communication device, the computing environment 10 and/or enterprise 26 may include a secondary communications device 86, such as a cellular router or gateway. In this regard, the industrial vehicles 12 may communicate wirelessly using the information linking device 38 as discussed above, e.g., using the normal wireless transceiver 46 and wireless protocol, such as an 802.11 b/g, etc. However, once a message has been received by the wired network, the secondary communications device 86 may selectively communicate the message via cellular network. This capability combines the features of an always-on communication technology, such as cellular, with the connectionless capabilities of the Internet. The use of a secondary communications device will be discussed in greater detail herein.

Data Collection

The information linking device 38 may, from time to time, collect information about the associated one of the industrial vehicles 12, the industrial vehicle operator and/or the environment of the industrial vehicle. Information may be collected, e.g., by reading the values from connected sensors 54, switches 56, encoders 58, impact sensors 60, meters 62 or other attached devices 64, e.g., which are coupled to the connector 39 and/or the monitoring input/output module 48. The information linking device 38 can also generate information that is received from the associated industrial vehicle network system 68, e.g., a CAN bus.

The format of the data that is communicated across the industrial vehicle, whether such data is generated from dedicated sensors attached to the industrial vehicle, or whether the information is communicated as network traffic on a corresponding bus, such as the vehicle network system 68, may or may not be suitable or otherwise optimal for wireless transmission by the information linking device 38. Such data may or may not also be suitable or optimally formatted for temporary storage by the memory of the interface controller 50 of the information linking device 38. Still further, the industrial vehicle application server 14 or other processing device in wireless data communication with the information linking device 38 may or may not require or be configured to handle all data that the industrial vehicle is capable of generating.

In this regard, the information obtained by the information linking device 38 may be temporarily stored, collected, maintained, manipulated, aggregated, summarized, encoded and/or otherwise processed, e.g., by the processor and corresponding memory in the interface controller 50 or other suitable processor and memory, which may be provided as part of the industrial vehicle electronics. Further, the collected information may be communicated to the industrial vehicle application server 14, for example, using the transceiver 46. The information linking device 38 may also communicate information utilizing the secondary transceiver 84 to one or more data processing devices, such as a server associated with the third party remote server 30.

As an illustrative example, the information linking device 38 may collect raw vehicle data or data that is presented in its native form as it is communicated across the industrial vehicle Thus, the information linking device 38 may, from time to time, wirelessly transmit vehicle information, such as event codes or other information derived from the vehicle network system 68, e.g., raw data from the vehicle network system 68, to an associated destination, such as the industrial vehicle application server 14, the remote third party server 30, or other suitable processing device.

As another illustrative example, the information linking device 38 can collect, aggregate, manipulate, summarize or otherwise transform collected data into logged data. Thus, collected information, e.g., logged data may be organized into a specific subset of formatted data that is required or otherwise desired by the associated industrial vehicle application server 14, the remote third party server 30, etc. Accordingly, the information linking device 38 may independently count time intervals or otherwise compute hour meter information, e.g., to compute log-on hours, or other specialized hour meters, collect and/or format sensor data, etc. The transformed log data can subsequently be communicated to an associated destination, such as the industrial vehicle application server 14, the remote third party server 30, or other suitable processing device.

The information linking device 38 may also collect, format and/or otherwise transform data related to industrial vehicle operation, which is not per se generated by sensors or other components of the associated one of the industrial vehicles 12. For example, the information linking device 38 may enable or otherwise control operator log on sequences, display and record checklist operations, etc. In this regard, the information linking device 38 may be utilized as a control mechanism to limit and/or selectively enable industrial vehicle startup, and to present checklists for completion by the operator before extended use. The information linking device 38 may also serve as a data logger of the activities where the information linking device 38 functions as a controller.

Thus, the information linking device 38 may be used to facilitate the coupling of data logging from an industrial vehicle to the industrial vehicle application server 14 or other wirelessly accessible data processing device. As will be described in greater detail herein, this approach can be used to create a history of operational data that may vary over time, such as vehicle speed, vehicle temperature, battery state of charge, vehicle proprietary service codes, height, weight and other measurable parameters associated with the load carrying features of the industrial vehicle, operator information, etc.

Moreover, data can flow from the industrial vehicle application server 14 and optionally, from the third party remote server 30 or other authorized processing device to the information linking device 38 via the transceiver 46. Thus, as will be described in greater detail herein, an industrial vehicle may be configured to implement special processing based upon parameters defined by the industrial vehicle application server 14, e.g., to collect specifically requested or otherwise non-standard types of data, to receive and implement commands, to receive data from the industrial vehicle application server 14, to collect or to convey different types of data based upon different modes of operation selected by the industrial vehicle application server 14, to require the vehicle to implement certain defined functions, etc.

According to further aspects of the present invention, there are times that may arise when specialized, vehicle specific or other non-standardized data is required from one or more particular industrial vehicles 12. For example, it may be desirable for a remote software application to acquire information that the information linking device 38 does not routinely communicate, e.g., to the industrial vehicle application server 14 as part of its normal data logging operations.

Industrial Vehicle Pulse

According to various aspects of the present invention, an industrial vehicle 12 is configured to internally transmit a cyclical recurring vehicle information message that encodes, encapsulates or otherwise includes a collection of parameters/data that represents or otherwise characterizes industrial vehicle information. The collection of data may include, for example, event codes, component states, component status information, hour meter readings, energy measurements, hydraulic measurements or other relevant data that is associated with a corresponding industrial vehicle 12.

According to various aspects of the present invention, the vehicle network system 68 may comprise a CAN bus. In this regard, the vehicle information message is circulated through the CAN bus.

Figure 6:
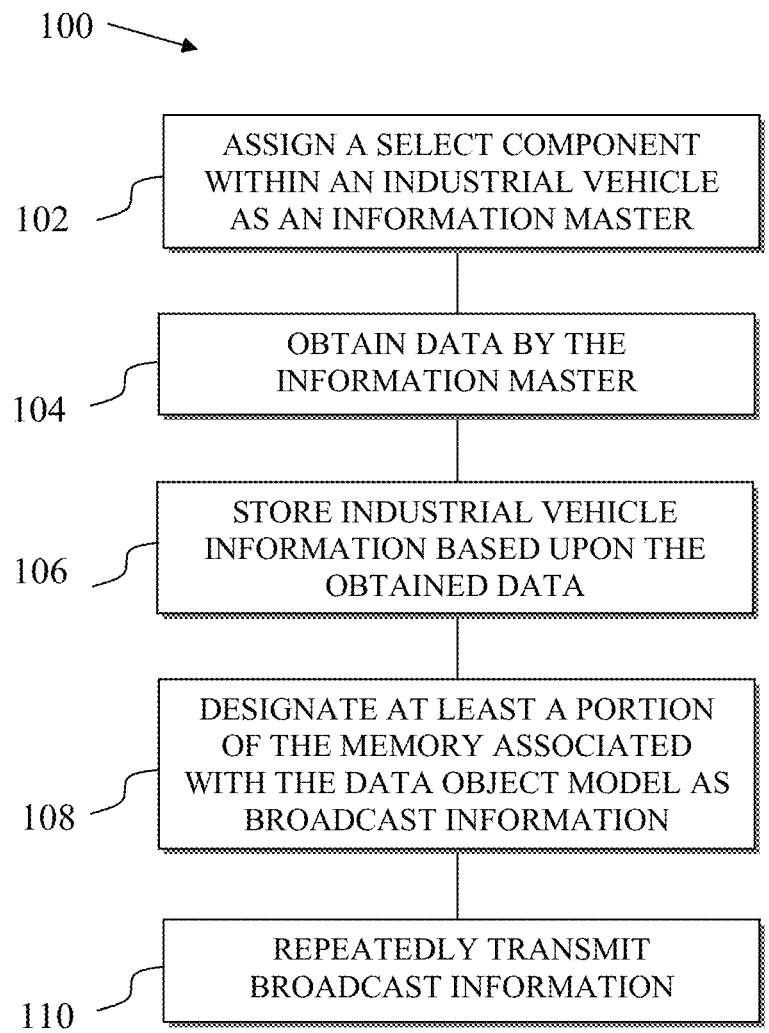
FIG. 6 is a flow chart illustrating a method of dynamically generating industrial vehicle information for distribution on an industrial vehicle network bus, according to various aspects of the present invention.

Referring to FIG. 6, a method 100 of dynamically generating industrial vehicle information for distribution on an industrial vehicle network bus is illustrated. The method 100 comprises assigning a select component within an industrial vehicle as an information master at 102, where the information master is capable of data communication across an industrial vehicle network bus, such as a CAN bus. The information master obtains data from at least one other component of a corresponding industrial vehicle that is connected to the industrial vehicle network bus at 104 and stores industrial vehicle information based upon the obtained data in a memory device accessible by the information master according to a mapping specified by a data object model at 106.

In this regard, the "industrial vehicle information" that is stored may comprise the obtained data itself, or the information master may derive, create, transform or otherwise generate the industrial vehicle information based upon the obtained data, e.g., by aggregating, modifying, combining, summarizing or otherwise manipulating the obtained data, either alone or in combination with other information accessible to the information master. Still further, the information master may create industrial vehicle information based upon knowledge obtained from obtained data, e.g., to compute customized hour meters, to create statistics or other information.

As used herein, the "data object model" refers generally to any arrangement, whether conceptual, hard programmed, soft programmed or otherwise known by the information master for associating the stored information with the associated context, e.g., variable type, of the stored information. By way of illustration and not by way of limitation, the data object model may be utilized by the information master to recognize and/or distinguish a particular piece of industrial vehicle information, e.g., battery charge information, and correspondingly be able to store and retrieve the battery charge information from its associated memory location (which may be dynamically or statically allocated). As such, the information master "understands" at least the identity of the variables that correspond to the industrial vehicle information stored in the memory.

As will be described in greater detail herein, the information manager broadcasts, e.g., transmits, communicates or otherwise conveys, at least a portion of the industrial vehicle information associated with the data object model. As such, at least a portion of the memory associated with the data object model is designated at 108 as broadcast information. In this regard, the designation may be merely conceptual, e.g., as where the entirety of the industrial vehicle information associated with the data object model is always broadcast, as described in greater detail herein. Alternatively, there may be times where something less than the entirety of the industrial information collected and stored according to the data object model is desired to be broadcast. For example, there may be certain operational modes, e.g., a service mode, where only certain types or variables of information are desired or otherwise required. In other circumstances, there may not be a need to circulate every event code or other fine grained piece of information. As a few other illustrative examples, where certain desired information is time sensitive, it may be desirable to delay, postpone or prevent the broadcast of non-essential information. Many other exemplary configurations may also/alternatively be implemented.

As noted above, the information master of the industrial vehicle internally transmits a cyclical recurring vehicle information message that encodes, encapsulates or otherwise includes a collection of parameters/data that represents or otherwise characterizes industrial vehicle information at 110. For example, the information master of the industrial vehicle may repeatedly perform a cyclical operation that includes extracting at least a portion of the information stored in the memory designated as broadcast information by the information master, generating a broadcast message containing the extracted broadcast information and transmitting the generated broadcast message on the industrial vehicle network bus. In this regard, the entire contents of the designated broadcast information are eventually transmitted on the industrial vehicle network bus, typically across a plurality of transmitted broadcast messages. Where the message is transmitted periodically, e.g., at a preset or otherwise predetermined time interval, the message may be conceptually construed as a "pulse" or "vehicle information pulse".

Exemplary Implementation of a Vehicle Information Pulse

A structure within the native electronics of a corresponding industrial vehicle, for example one of the industrial vehicles 12, may be designated as an "information" master. For example, any of the vehicle control modules that are capable of communicating across the vehicle network system 68 may be a possible candidate, e.g., any one of the display control module 70, input/output control module 72, vehicle control module 74, motor control module 76, hydraulics control module 78 or other controllers 80, in the example of FIG. 5. The designated information master in this exemplary configuration is programmed to periodically transmit across the vehicle network system 68, an encoded representation of industrial vehicle information. This transmitted industrial vehicle data can be received by the information linking device 38 because it also is connected to the vehicle network system 68. In this regard, any device that can "listen" for this "vehicle information pulse" can obtain and extract the associated vehicle information. For example, a service technician may be able to plug a laptop or other appropriate device into the vehicle network system 68 and also retrieve the vehicle information by listening to the vehicle information pulse.

In the illustrative example, the vehicle network system 68 is a CAN bus. Since CAN supports the broadcast of messages, the information master can transmit a message that the information linking device 38 can listen for to obtain the encoded representation of vehicle information. The information linking device 38 can then forward the received information to the industrial vehicle application server 14, the information linking device can also and/or alternatively summarize, store, log or otherwise process the received information.

According to further aspects of the present invention, each industrial vehicle may have a defined data object model that assigns or otherwise defines types of information that is available across its vehicle network system 68. Because different types/models of industrial vehicles will likely generate different types of data, each industrial vehicle may have its own data object model, or a data object model may be common across two or more industrial vehicles, e.g., with like models and feature sets. The information master of a particular industrial vehicle, such as one of the industrial vehicles 12, may utilize knowledge associated with a corresponding data object model to multiplex some or all of the available information identified by the corresponding data object model, e.g., designated broadcast information, into a packetized communication, e.g., a broadcast message, that is periodically transmitted/broadcast locally within the vehicle network system 68.

Figure 7:
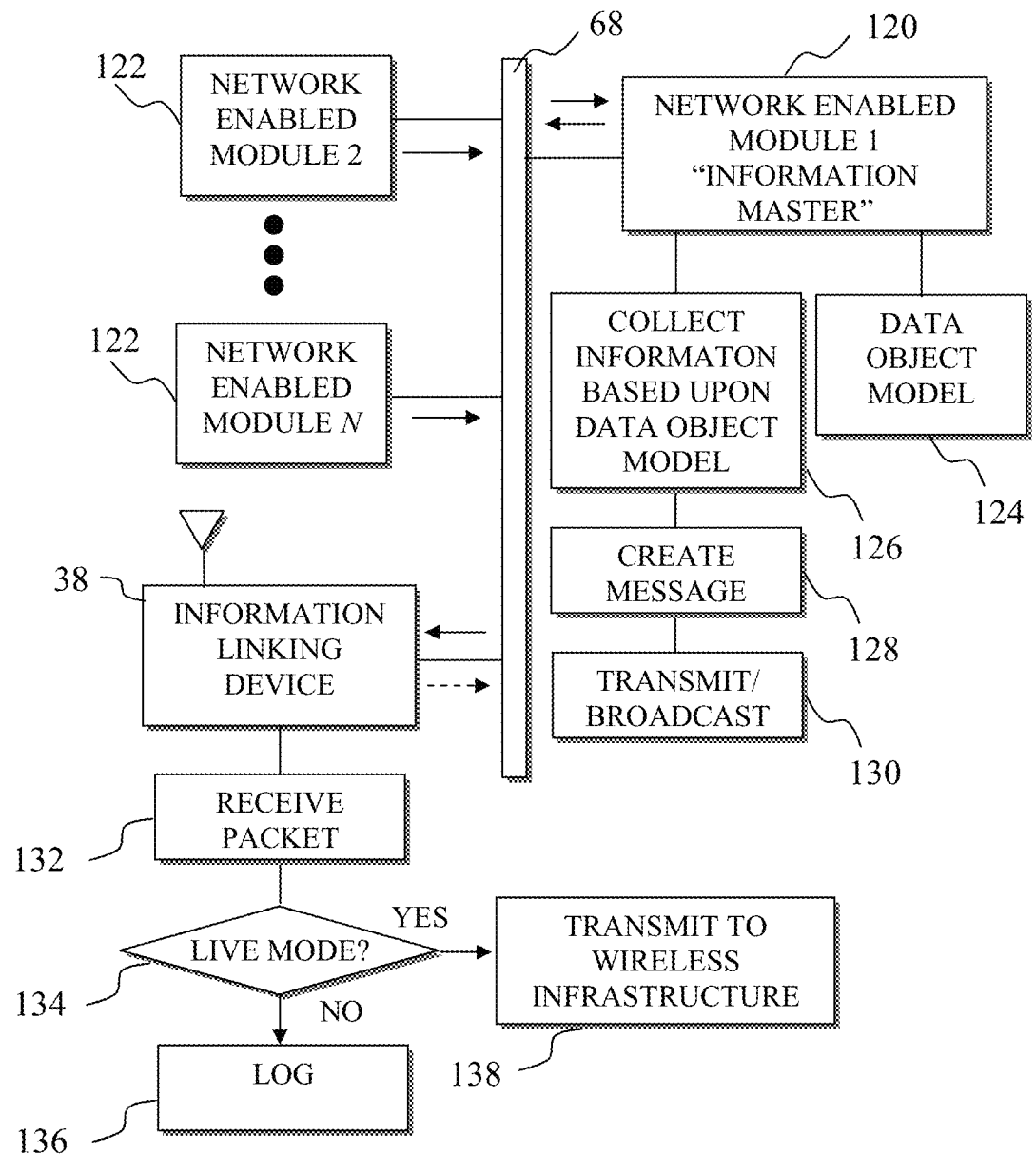
FIG. 7 is an illustration of a hybrid flow chart and schematic diagram illustrating two operating modes of an information linking device according to various aspects of the present invention.

For example, referring to FIG. 7, one of the devices connected to the vehicle network system 68, e.g., any one of the display controller 70, input/output controller 72, vehicle control module 74, motor control module 76, hydraulics control module 78 or other controllers 80 shown in the example of FIG. 5, is designated the information master 120. The remaining devices are generically labeled as network enabled modules 122, but may comprise any of the remaining ones of the display controller 70, input/output controller 72, vehicle control module 74, motor control module 76, hydraulics control module 78 or other controllers 80 shown in the example of FIG. 5.

The information master 120 collects and stores in memory, information from the various network enabled modules 122 as specified by a corresponding data object model 124 using a corresponding data discovery process at 126. To obtain the necessary information, the information master 120 may query appropriate network enabled modules 122, the network enabled modules 122 may, from time to time, transmit/broadcast the necessary information to the information master 120, the information master 120 may compute, derive, transform, summarize, aggregate industrial vehicle information etc., as described above.

The information master 120 further organizes the vehicle information according to the data object model 124, and creates a message at 128 and transmits or otherwise broadcasts the message across the vehicle network system/vehicle bus at 130. In this regard, the information that is associated with all (or part of) the data object model 124, i.e., the designated broadcast information, that is to be transmitted may be too large to transmit uninterrupted, either sequentially or serially without consuming too much bandwidth on the vehicle bus. As such, data multiplexing, etc., may be utilized to reduce each broadcast message to a manageable amount of data.

By way of illustration, and not by way of limitation, the data collected by the information master 120, e.g., according to the data object model 124 is conceptually organized into a data set, where the data set includes the entirety of information to be circulated/broadcast but not necessarily the entirety of the information available across the vehicle network system 68. The data set may be further conceptually defined by subsets of data, which may be organized based upon any desired classifications/categories. For example, each message may be organized into one or more message components, where each message component is packed with data corresponding to an associated subset of data stored in memory according to the data object model 124. As such, each broadcast message may include the data set, one or more data subsets, and/or multiplexed portions of the data set, data subsets, etc.

The information master 120 may periodically transmit each broadcast message, e.g., based upon a predetermined time interval. To facilitate data transmission, each message instance created at 130 includes a subset or an encoded subset of the information associated with the data object model 124. In this regard, a recipient such as the information linking device 38 may have to listen for multiple instances of the created and transmitted message in order to reconstruct the entirety of the data set corresponding to the designated broadcast information. In this regard, by listening and capturing an entire sequence of messages, a listening device can obtain all relevant industrial vehicle information that is provided by the information master 120.

Further, any number of trigger mechanisms may be utilized to designate when the information master 120 is to transmit the vehicle information or multiplexed portion of the information. By way of illustration and not by way of limitation, the information master 120 may be configured to generate a new message based upon a reoccurring event, e.g., based upon time. In this implementation, the information master 120 may transmit a new message every X milliseconds or some other designated period or interval.

Depending upon the particular industrial vehicle bus implementation, it may be necessary or desirable to assign the information master 120 a relatively high or low priority on the bus. For example, in the CAN bus protocol, each node can have a priority assigned thereto. The CAN system conveniently features an automatic "arbitration free" transmission. That is, a CAN message that is transmitted with highest priority will "win" the arbitration, and the node transmitting the lower priority message will sense that it is a subordinate and will wait to transmit any information until the higher priority module has transmitted its message. Thus, at a periodic time pulse, the information master 120 may broadcast globally across the CAN bus, the next message containing CAN bus information. Thus, by using multiplexing and/or encoding, the designated industrial vehicle information can be "circulated" or pulsed across the associated CAN bus without exhausting the bus bandwidth.

As yet another illustrative example, a hand-shake operation may be performed, where the information master 120 receives a request for a message that contains vehicle information or a multiplexed portion of vehicle information. Thus, the passing of information can be event triggered. For example, because the information master 120 knows the context of vehicle information and where it is stored in memory, the information master 120 may optionally be configured to respond to queries or other suitably formatted requests for industrial vehicle information that is associated with the corresponding data object model.

As still another illustrative example, the information master 120 may receive a request for a particular piece of information, e.g., the value of a variable defined by the data object model. In response thereto, the information master 120 can fetch the specifically requested information and attach, embed, encode or otherwise incorporate the specifically requested information in one or more messages that are transmitted as part of the vehicle information pulse.

Moreover, because the vehicle information pulse repeatedly refreshes the state of industrial vehicle information of variables associated with the data object model 124, the information linking device 38 attached to an industrial vehicle 12 transmitting such a pulse can listen for the transmission/broadcast of this message on the vehicle network system 68 and can utilize the information in any number of ways.

By way of illustration and not by way of limitation, the information linking device 38 may decide to operate in a "live" mode or a "normal", non-live mode at 134. If the information linking device 38 is operating in the normal mode at 136, the information linking device 38 may utilize information received in the messages over time to populate, aggregate, summarize or otherwise derive its own defined fields of information that the corresponding information linking device 38 routinely transmits to the associated industrial vehicle application server 14. Thus, for example, instead of independently calculating hour meter readings based upon inputs 54-64, the information linking device 38 can utilize the hour meter information already provided in the native electronics of one of the industrial vehicles 12 that is put onto the vehicle network system 68, e.g., a CAN bus, as part of a vehicle information pulse, to read, compute or otherwise derive the desired hour meter data.

Still further, the information linking device 38 can utilize the actual hour meter data within the native industrial vehicle information that is transmitted within the vehicle information pulse to generate customized hour meters by manipulating the received information, performing aggregations, computations, filters, or other manipulations based upon programmed or customizable requirements. In this regard, various aspects of the present invention are not limited to the collection of hour meter data. Rather, any desired vehicle information that is associated with the corresponding data object model 124 may be collected, aggregated, summarized, transformed, processed, or otherwise manipulated, e.g., to other data abstractions, by the information linking device 38.

Still further, the information linking device 38 can collect, aggregate, combine or otherwise integrate information obtained from the vehicle information pulse off the CAN bus, with information obtained from other inputs, e.g., via the input/output module 48. The collected and logged data can then be transmitted to the associated industrial vehicle application server 14 as described more fully herein, e.g., according to the routine protocol set forth for initiating communication between the industrial vehicle application server 14 and a corresponding information linking device 38.

As another example, in "live" mode at 138, the information linking device 38 can pass the received information read from the vehicle information pulse via its wireless capability to the industrial vehicle application server 14 or to some other application or server. Thus, according to various aspects of the present invention, in live mode, the information linking device 38 acts as a forwarding or bridging device by forwarding received vehicle information pulse messages from the information master 120 to the wireless infrastructure. In this regard, the server 14 or other device receiving the transmitted vehicle information pulse must be able to understand the information that is multiplexed, encoded or otherwise incorporated into each transmitted message. Thus, for example, a software application that receives the vehicle information pulse messages wirelessly transmitted by the information linking device 38 may have access to a corresponding data object model to understand and reconstruct the received information.

If operating in live mode, the information linking device 38 may continue to log data in the background as it does for normal or non-live mode. However, in live mode, the information linking device 38 can facilitate streaming of industrial vehicle CAN bus information as noted in greater detail herein. Once the information linking device 38 exits live mode, it can dump the summarized, aggregated and otherwise collected data as described more fully herein and in patent application Ser. No. 11/956,022 (Published as U.S. 2008-0154712 A1) entitled "Fleet Management System", filed Dec. 13, 2007, which is hereby incorporated by reference in its entirety. The present application also hereby incorporates by reference, patent application Ser. No. 11/956,045 (Published as U.S. 2008-0154691 A1), entitled "Fleet Management System" filed Dec. 13, 2007, in its entirety. Still further, the present application incorporates by reference, U.S. Provisional Pat. App. No. 61/166,494, entitled "INFORMATION SYSTEM FOR INDUSTRIAL VEHICLES", filed Apr. 3, 2009, in its entirety.

Bi Directional Communication

According to various aspects of the present invention, a communications protocol is provided, which allows queries to be submitted to a particular information linking device 38 to ascertain specific information from a corresponding one of the industrial vehicles 12 that may not otherwise be routinely provided to the vehicle application server 14. Depending upon the particular implementation, the communications protocol may even support ad-hoc queries to a particular industrial vehicle 12. Still further, the approach facilitates the commingling of standardized data communication with customizable and/or configurable requests for information.

According to various aspects of the present invention, bi-directional Industrial vehicle information communication may be implemented. In this regard, the industrial vehicle application server 14 may send a communication to a targeted one of the industrial vehicles 12. In this regard, upon receiving the request, the information linking device 38 may take an appropriate action, such as to forward the message out to the vehicle network system 68, e.g., a CAN bus, to the information master 120, or to take predetermined actions.

By way of illustration, and not by way of limitation, the information linking device 38 of a targeted one of the industrial vehicles 12 may receive a request from the industrial vehicle application server 14 for a specific piece of information, e.g., the value of a variable associated with the corresponding data object model 124 of the targeted one of the industrial vehicles 12. The information linking device 38, acting as a bridge, may forward the request or otherwise communicate a request to the information master 120 for the desired information. The information master 120 may fetch the requested information from memory and transmit the requested information to the information linking device 38. Alternatively, the information master 120 may encode, embed, append, insert or otherwise include the requested information in one or more vehicle information pulse messages. In this regard, by listening for the information pulse messages, the information linking device 38 can extract the requested information and pass the requested information back to the requesting device, e.g., the industrial vehicle application server 14.

As another exemplary illustration, and not by way of limitation, the integration of industrial vehicle information linking device 38 into the control system of a corresponding one of the industrial vehicles 12 may be used to facilitate "performance tuning" of the corresponding industrial vehicle. A performance rating may be received from the industrial vehicle applications server 14 for the operator logged onto the corresponding materials handling vehicle. In response thereto, instructions may be communicated from the processor provided within the interface controller 50 of the information linking device 38 or otherwise integrated into the corresponding materials handling vehicle to at least one component of the industrial vehicle across the vehicle network system 68, e.g., a CAN bus, to selectively limit, disable or configure the performance of at least one feature based upon the performance rating associated with that operator. Such commands may also be implemented by the information master 120 in response to a request by the information linking device 38.

As another example, the industrial vehicle application server 14 may store a list of authorized operators, which may also include a license/certification management aspect that makes sure that each operator who is otherwise authorized to operate one of the industrial vehicles 12 maintains a valid and up to date operator's license. According to this aspect of the present invention, performance data is also associated with each authorized user.

The implementation of "performance tuning" may be utilized as a way to rank authorized and licensed/certified operators according to experience and skill, and to adjust the operating characteristics of the industrial vehicle accordingly. As an authorized operator's performance rating is improved, the industrial vehicle may unlock or otherwise enable advanced features, modify features and industrial vehicle capabilities and/or otherwise adjust one or more operating characteristics to match the capability of the operator. Correspondingly, the industrial vehicle may disable advanced features, limit capabilities, and alter performance capabilities, etc., for relatively lower ranked/skilled operators.

Miscellaneous Considerations

The various aspects of the present invention described herein, provide a messaging system that communicates industrial vehicle information in a unified format. In this regard, various applications ranging from service and/or maintenance diagnostics software and enterprise management software can all derive value from the same data set that is circulated or pulsed through the associated industrial vehicle.

Alternative Computing Environments

Figure 8:
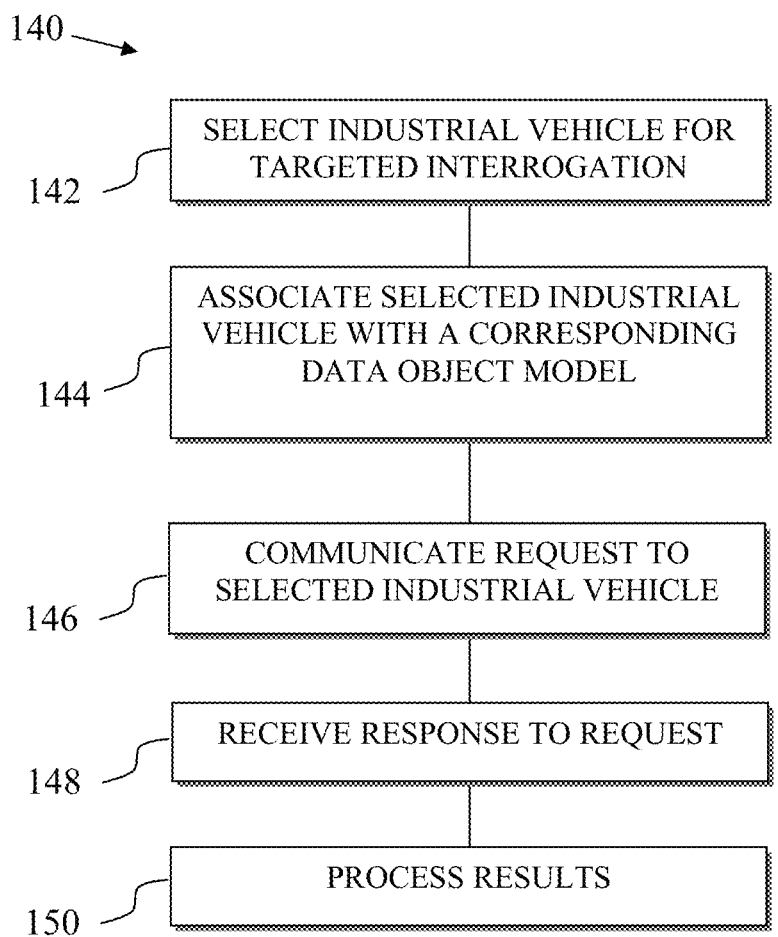
FIG. 8 is a flow chart illustrating a method of an application server requesting information from an industrial vehicle according to various aspects of the present invention.

According to further aspects of the present invention, a remote server computer may query an information linking device 38 to obtain context specific industrial vehicle information. Referring to FIG. 8, a method 140 of reading industrial vehicle information comprises selecting an industrial vehicle for targeted interrogation at 142. As noted in greater detail herein, the industrial vehicle application server 14 can communicate with select information linking devices 38 to associate a selected one of the industrial vehicles 12 with a corresponding data object model at 144. For example, the various industrial vehicles within a fleet may be organized by vehicle type, model year, software revision, etc. into one or more data object models. The industrial vehicle application server 14 utilizes the data object model to identify the desired information necessary from the associated one of the industrial vehicles 12, and a request is communicated at 146 to obtain the requested information.

For example, the industrial vehicle application server 14 may require a specific data value from a corresponding one of the industrial vehicles 12, where the required data is information of a type that is communicated across the corresponding industrial vehicle bus, and which is associated with the corresponding data object model 124. In an illustrative example, the information application server 14 knows the data object model 124 associated with the industrial vehicle of interest. Thus, the industrial vehicle application server 14 may issue a query or otherwise send a message to the information linking device 38 on the associated industrial vehicle that includes the identification of the requested information, e.g., by specifying the memory address, a code or some other designation that identifies the requested information. By way of illustration, the information linking device 38 may request "packet 24". The information linking device 38 and/or the corresponding information master 120 understands "packet 24" and resolves the request to provide the requested information. For example, the information linking device 38 may request the information from the information master 120. The information master 120 may then communicate the requested information to the information linking device 38. The associated industrial vehicle application server 14 receives the requested information from the associated information linking device 38 at 148 and performs some process based upon the received information at 150. According to various aspects of the present invention, the query to the information master 120 can request any data that is addressed on the associated data object model. Still further, as noted in greater detail herein, the information master 120 can communicate the requested information via the vehicle information pulse, which can be read by the information linking device 38, then subsequently forwarded to the industrial vehicle application server 14.

Alternative Exemplary Computing Environments

Figure 9:
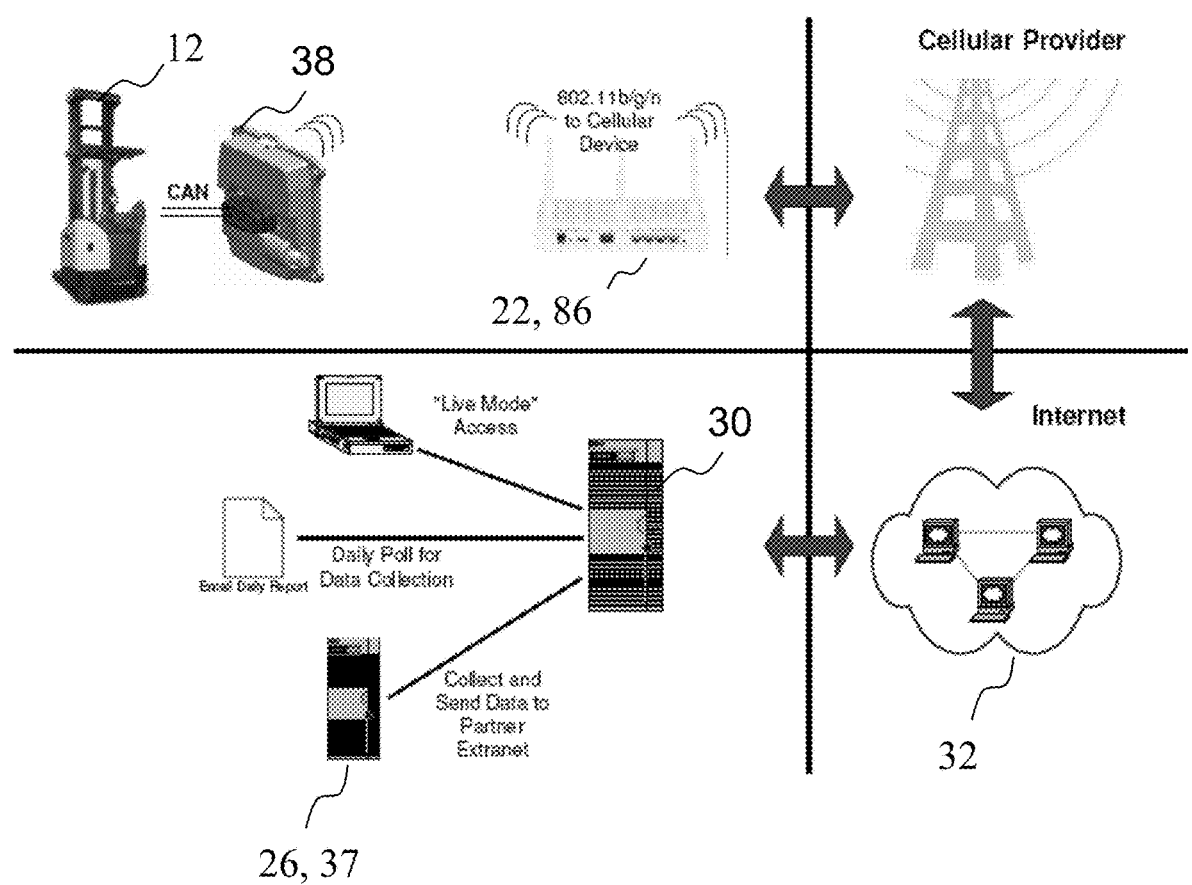
FIG. 9 is a schematic diagram of an exemplary network system that integrates communication between an industrial vehicle operating at a first facility and a remote third party server computer, according to various aspects of the present invention.

As noted in greater detail herein, numerous exemplary arrangements may be implemented as an alternative to that disclosed in FIG. 1. In the illustrative example of FIG. 9, each one of the industrial vehicles 12 includes an information linking device 38. The information linking device 38 communicates, e.g., via 802.11 to a wireless router 22 that includes an integrated cellular link 86. The cellular link 86 communicates, e.g., via a cellular provider, to the third party remote server 30. For example, a corresponding cellular link may be connected to the third party server computer 30 such that the respective cellular routers form a cellular modem. The cellular communicated data, e.g., data derived from the corresponding vehicle information pulse, is converted back to an appropriate network protocol, e.g., TCP/IP. Once the industrial vehicle data is received by the third party remote server 30, the server can process the data and utilize the data for any number of applications.

Figure 10:
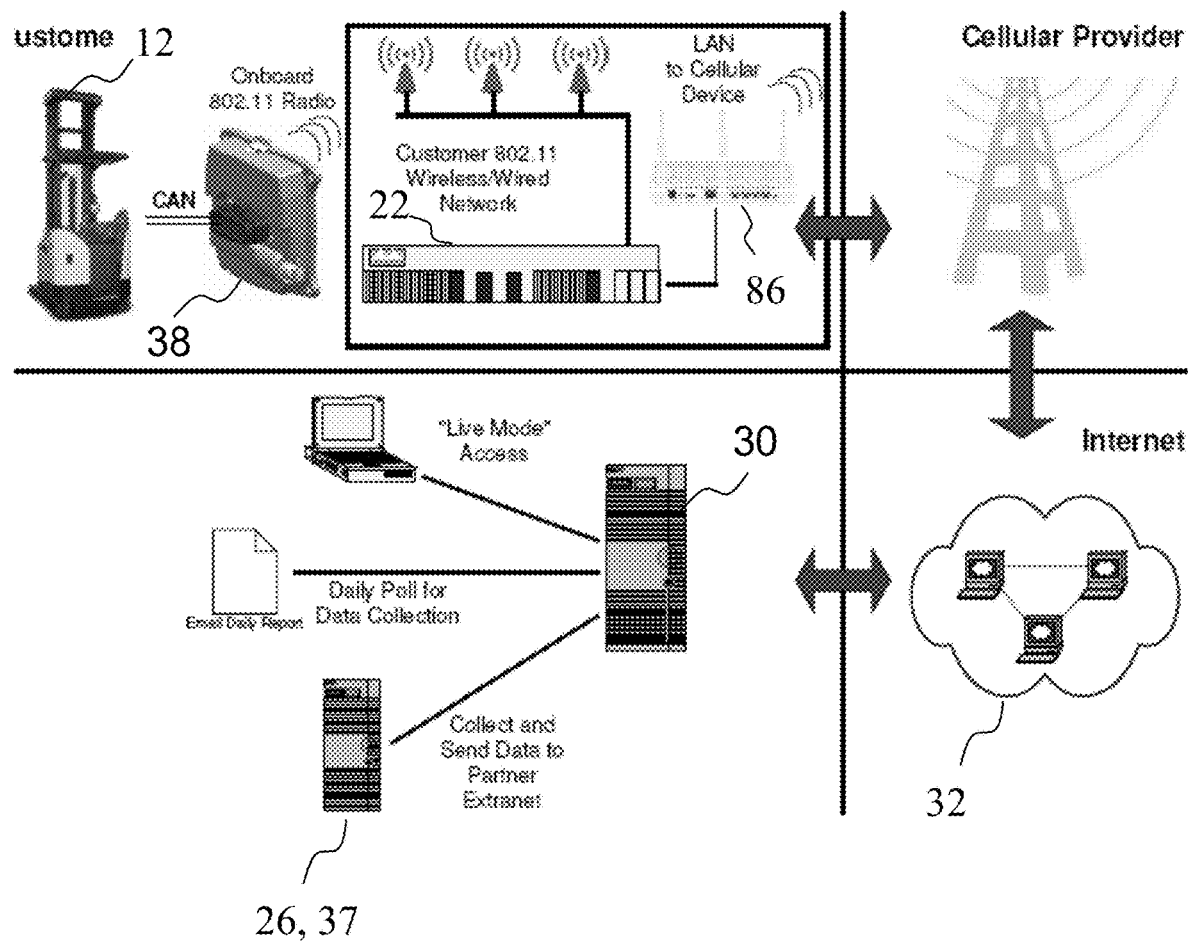
FIG. 10 is a schematic diagram of another exemplary network system that integrates communication between an industrial vehicle operating at a first facility and a remote third party server computer, according to various aspects of the present invention.

Referring to FIG. 10, an alternative exemplary system is illustrated. The system of FIG. 10 is substantially similar to that of FIG. 9. However, as illustrated in FIG. 10, the cellular link 86 is connected into the router 22. In this manner, the industrial vehicle is capable of maintaining cellular communication across multiple access points, thus providing more flexible cellular range and coverage within the facility in which the industrial vehicle is being operated.

Figure 11:
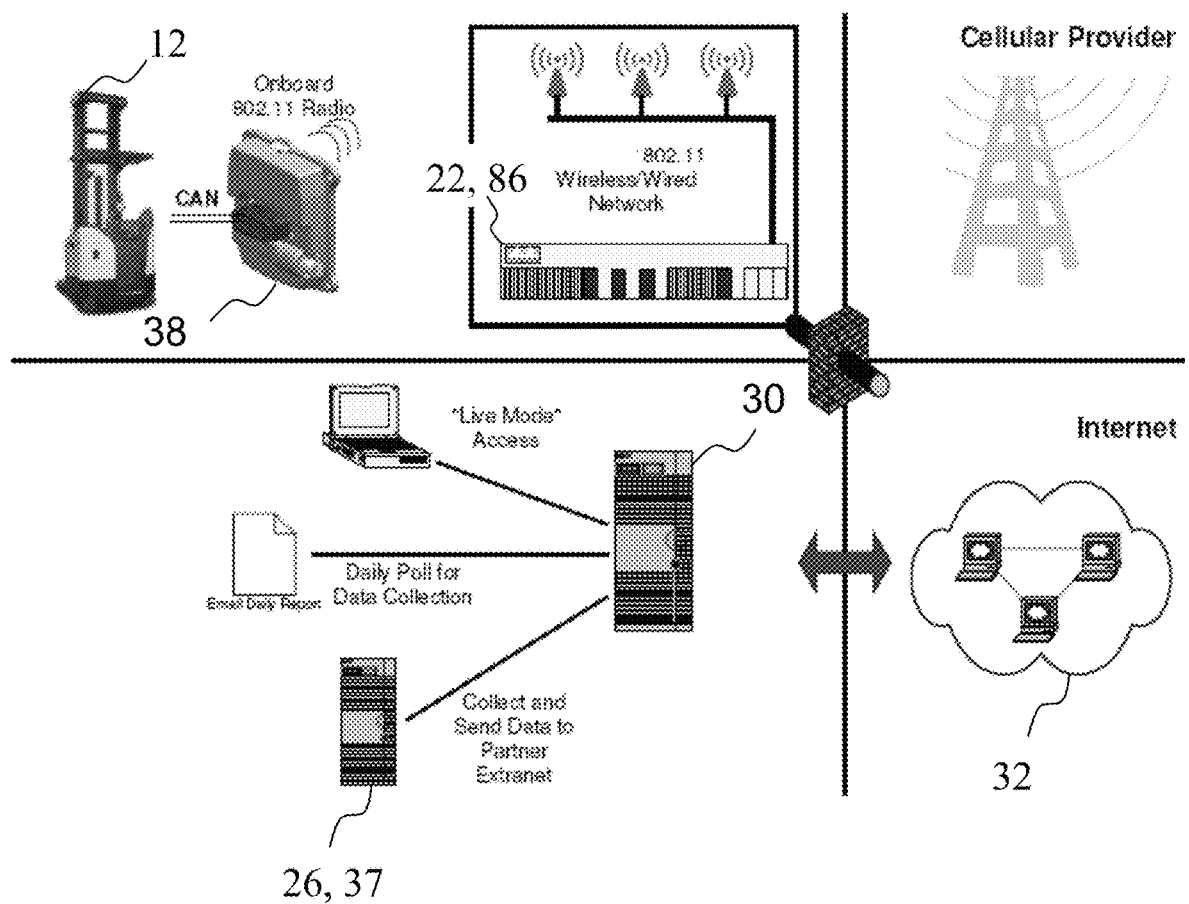
FIG. 11 is a schematic diagram of yet another exemplary network system that integrates communication between an industrial vehicle operating at a first facility and a remote third party server computer, according to various aspects of the present invention.

Referring to FIG. 11, yet another alternative exemplary system is illustrated. The system of FIG. 11 is substantially similar to that of FIG. 9. However, in the example of FIG. 11, the router 22 is also connected to the network 32, e.g., the Internet, thus facilitating both a continuous connection/cellular-based connection path and a connectionless/network-based communication path between the industrial vehicle and/or servers within the enterprise 26 associated with the industrial vehicle and the corresponding third party remote server 30.

Figure 12:
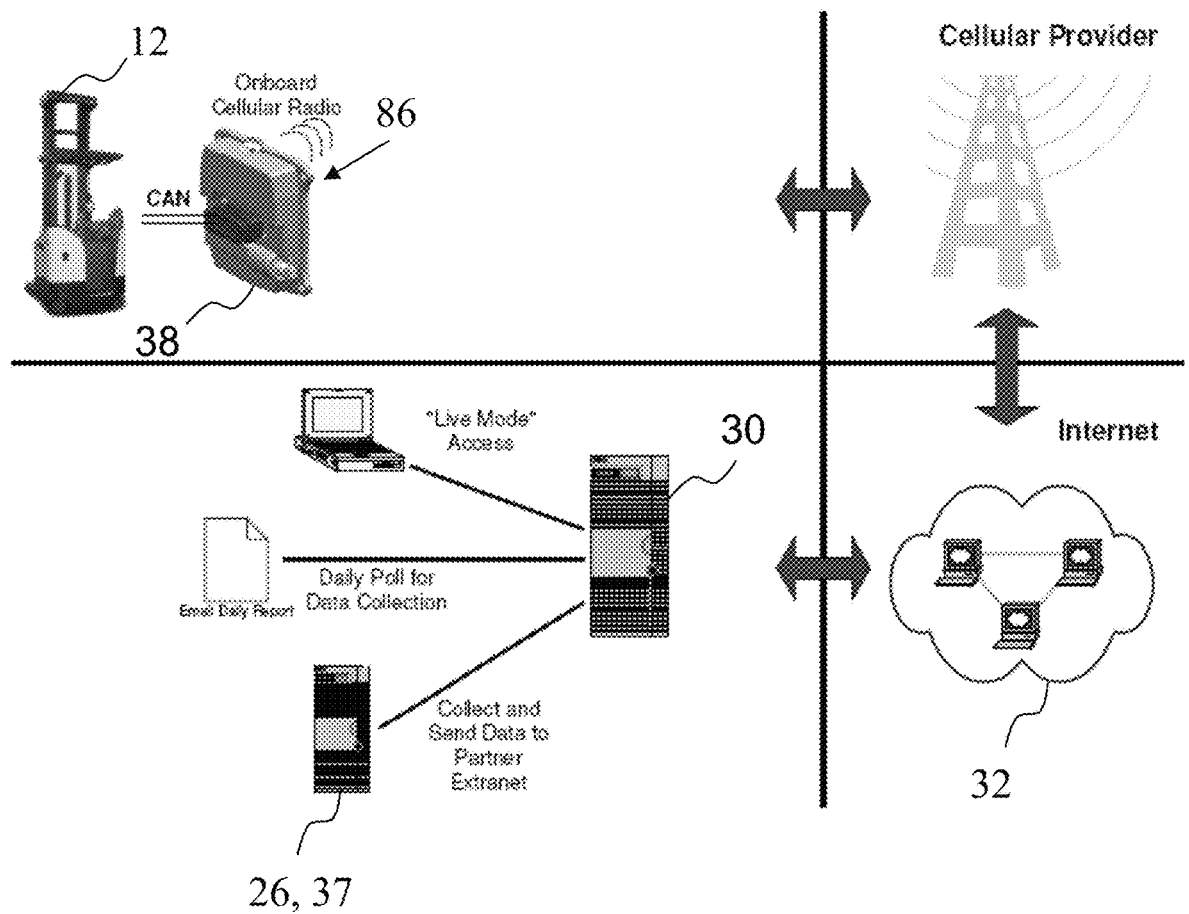
FIG. 12 is a schematic diagram of still another exemplary network system that integrates communication between an industrial vehicle operating at a first facility and a remote third party server computer, according to various aspects of the present invention.

Referring to FIG. 12, yet another alternative arrangement is illustrated. The system of FIG. 12 is substantially similar to that of FIG. 9. However, as illustrated in FIG. 12, the cellular link 86 at the enterprise is integrated into the information linking device 38 on the associated one of the industrial vehicles 12. In this manner, the industrial vehicle is capable of maintaining cellular communication across multiple access points, thus providing more flexible cellular range and coverage within the facility in which the industrial vehicle is being operated.

For example, the remote third party server 30 may host a communication server that provides a service that allows a client, e.g., as illustrated by the laptop computing device 152, to execute a desktop tool that can connect with the information linking device 38 on any one of the industrial vehicles 12 that can successfully negotiate cellular bandwidth. Thus, to commence cellular based communication, the target industrial vehicle must be capable of cellular communication, e.g., via any of the configurations described more fully herein.

In an exemplary implementation, the cellular communication link is created between the desktop client via the communications server hosted by the third party remote server 30 and a corresponding one of the industrial vehicles 12. The desktop software may implement a recorder tool that is capable of capturing a window of data that encapsulates the collection of industrial vehicle information. For example, by recording one or more sequences of messages, e.g., using the live mode of the associated information linking device 38 to capture vehicle information pulse messages, a complete forensics record may be created. Moreover, enough data may be gathered to enable the desktop software to sample and then replay the sampled data back through a desktop software application, off-line. Still further, the communications server may be configured to record event triggered data. In this regard, the communications server may access the collected industrial vehicle information, e.g., for running dashboards, for performing equipment health monitoring, etc.

The communication server hosted on the third party server 30 may also be utilized to poll information linking devices 38 for periodic data capture. The third party remote server 30 may also trigger workflows based upon processing the received data, e.g., as illustrated by the emailed daily report 180. Still further, the data may be manipulated, aggregated or otherwise processed. Such processed data may then be communicated back out over the network such as the Internet to other servers, e.g., back to an industrial vehicle application server 14 associated with the industrial vehicle, to partners via an Extranet, etc. Thus, for instance, information may be communicated to a sales branch, maintenance or service branch, etc., to respond proactively to issues detected based upon an analysis of the collected data.

Keeping with the above examples herein, the information linking device 38 may collect information, e.g., event codes, component states, meter values, etc., from the vehicle network system 68, e.g., a CAN bus, and communicate this information to the third party remote server 30. The third party remote server 30 may also and/or alternatively, query the information linking device 38 for specific information via the cellular connection. Thus, for example, a service technician can interactively analyze any one of the industrial vehicles 12.

Having thus described the invention of the present application in detail and by reference to preferred embodiments thereof, it will be apparent that modifications and variations are possible without departing from the scope of the invention defined in the appended claims.

What is claimed is:

1. An information system for an industrial vehicle, the system comprising:
an information master on the industrial vehicle that is programmably configured to collect data by communicating across a vehicle network bus of the industrial vehicle with at least one other component of the industrial vehicle; and
memory that stores industrial vehicle information according to a mapping specified by a data object model, where the industrial vehicle information is based upon the data collected by the information master;
wherein:
a processor on the industrial vehicle is programmed to repeatedly perform a cyclically recurring operation that:
extracts at least a portion of the industrial vehicle information stored in the memory according to the mapping specified by the data object model as broadcast information;
generates at least one broadcast message representing the extracted broadcast information; and
transmits the generated at least one broadcast message on the vehicle network bus;
wherein an entire contents of the broadcast information are repeatedly transmitted across the vehicle network bus in a cyclically recurring manner.

2. The information system according to claim 1, wherein the information master comprises a network bus-enabled vehicle electronic control module.

3. The information system according to claim 1, wherein the vehicle network bus comprises at least one communications strategy including controller area network (CAN) bus, ZigBee, Bluetooth, Local Interconnect Network (LIN), and time-triggered data-bus protocol (TTP), and the processor is implemented in the information master.

4. The information system according to claim 1, wherein:
the vehicle network bus comprises a controller area network (CAN) bus; and
the processor is implemented as the information master.

5. The information system according to claim 1, wherein the processor is further configured to transmit each generated broadcast message based upon a predetermined periodic time interval.

6. The information system according to claim 1, wherein the processor transmits the generated at least one broadcast message on the vehicle network bus by streaming the generated at least one broadcast message.

7. The information system according to claim 6, wherein the processor is further programmed to:
set a periodic time interval;
extract at least a portion of the industrial vehicle information stored in the memory corresponding to the periodic time interval;
generate at least one broadcast message corresponding to the periodic time interval; and
transmit the generated at least one broadcast message corresponding to the periodic time interval.

8. The information system according to claim 7, wherein the periodic time interval is within a range of 1-999 milliseconds.

9. The information system according to claim 1, wherein the information master is implemented as an information linking device that enables wireless communication with a remote server.

10. The information system according to claim 1, wherein the processor is further programmed to:
compute industrial vehicle information from at least a portion of the obtained data;
create statistics from at least a portion of the obtained data;
or a combination thereof.

11. The information system according to claim 1, wherein:
an information linking device receives the broadcast information transmitted across the vehicle network bus; and
the information linking device wirelessly transmits the broadcast information to a remote server.

12. The information system according to claim 1, wherein the information master obtains data by submitting a query to at least one other component of the industrial vehicle across the vehicle network bus.

13. The information system according to claim 1, wherein the information master obtains data by receiving data from at least one other component of the industrial vehicle across the vehicle network bus.

14. The information system according to claim 1, wherein:
the at least one broadcast message comprises a plurality of broadcast messages; and
a device connected to the vehicle network bus must receive each of the plurality of broadcast messages in order to reconstruct the entirety of the broadcast information.

15. The information system according to claim 1, wherein the processor is further programmed to operate in a select one of a live mode or a normal mode, wherein:
when operating in the normal mode, an information linking device connected to the vehicle network bus is programmed to:
receive the cyclically recurring transmission of the broadcast information; and
log the received broadcast information; and
when operating in the live mode, the information linking device is programmed to:

receive the cyclically recurring transmissions of the broadcast information; and
wirelessly transmit the received broadcast information to a remote server.

* * * * *